(12) United States Patent
Tagami

(10) Patent No.: US 11,955,146 B2
(45) Date of Patent: Apr. 9, 2024

(54) MAGNETIC DISK DEVICE AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Naoki Tagami, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/179,824

(22) Filed: Mar. 7, 2023

(65) Prior Publication Data

US 2024/0046958 A1 Feb. 8, 2024

(30) Foreign Application Priority Data

Aug. 8, 2022 (JP) ................. 2022-126097

(51) Int. Cl.
*G11B 5/012* (2006.01)
*G11B 5/02* (2006.01)
(Continued)

(52) U.S. Cl.
CPC ............... *G11B 5/012* (2013.01); *G11B 5/02* (2013.01); *G11B 5/1878* (2013.01);
(Continued)

(58) Field of Classification Search
None
See application file for complete search history.

(56) References Cited

U.S. PATENT DOCUMENTS 5,459,623 A * 10/1995 Blagaila ............... G11B 5/5965
7,046,465 B1 * 5/2006 Kupferman ........ G11B 5/59688
360/48
(Continued)

FOREIGN PATENT DOCUMENTS

JP 2018-156703 10/2018
JP 2020-144965 9/2020
(Continued)

*Primary Examiner* — William J Klimowicz
(74) *Attorney, Agent, or Firm* — Knobbe, Martens, Olson & Bear, LLP

(57) ABSTRACT

According to one embodiment, in a magnetic disk, a plurality of first servo sectors is arranged at intervals in the circumferential direction. Each of the plurality of first servo sectors includes a first area and a second area. First information including a preamble, a servo mark, and a Gray code is written in the first area. The second area is disposed after the first area in a write and read direction along the circumferential direction, and second information including a burst pattern is written in the second area. The plurality of first servo sectors includes a plurality of second servo sectors and a plurality of third servo sectors. The circumferential length of a first area included in each of the plurality of third servo sectors is longer than the circumferential length of a first area included in each of the plurality of second servo sectors.

20 Claims, 23 Drawing Sheets

(51) Int. Cl.
  *G11B 5/187* (2006.01)
  *G11B 5/55* (2006.01)
  *G11B 5/596* (2006.01)

(52) U.S. Cl.
  CPC ........ *G11B 5/5526* (2013.01); *G11B 5/59638* (2013.01); *G11B 5/59655* (2013.01)

(56) References Cited

U.S. PATENT DOCUMENTS

| | | | |
|---|---|---|---|
| 7,688,538 B1 * | 3/2010 | Chen | G11B 5/59666 360/75 |
| 8,711,506 B1 | 4/2014 | Giovenzana et al. | |
| 8,861,118 B1 | 10/2014 | Creech et al. | |
| 8,982,505 B2 | 3/2015 | Kawabe et al. | |
| 9,129,630 B1 * | 9/2015 | Guo | G11B 5/59655 |
| 9,947,351 B1 | 4/2018 | Matsuzawa | |
| 10,109,301 B1 * | 10/2018 | French, Jr. | G11B 5/5526 |
| 10,163,459 B1 | 12/2018 | French, Jr. | |
| 10,748,569 B1 * | 8/2020 | Ogawa | G11B 5/59666 |
| 10,847,182 B2 | 11/2020 | Furuhashi | |
| 10,872,631 B1 | 12/2020 | Tagami et al. | |
| 11,087,796 B2 * | 8/2021 | Tagami | G11B 5/59633 |
| 11,100,947 B1 | 8/2021 | Tagami | |
| 11,355,151 B2 | 6/2022 | Tagami | |
| 11,475,913 B2 | 10/2022 | Tagami | |
| 11,495,261 B2 | 11/2022 | Tagami | |
| 2003/0112539 A1 * | 6/2003 | Shu | G11B 5/59627 360/48 |
| 2022/0301584 A1 * | 9/2022 | Tagami | G11B 5/012 |

FOREIGN PATENT DOCUMENTS

| | | |
|---|---|---|
| JP | 2020-155195 | 9/2020 |
| JP | 2021-044030 | 3/2021 |
| JP | 2021-131920 | 9/2021 |
| JP | 2022-101038 | 7/2022 |

* cited by examiner

FIG.8

|  |  | TYPE OF SERVO SECTOR | |
|---|---|---|---|
|  |  | NORMAL SERVO SECTOR | SHORT SERVO SECTOR |
| TYPE OF OPERATION | WRITE OPERATION | NomalSG1 | ShortSG |
|  | READ OPERATION | NomalSG1 | NomalSG2 |
|  | SEEK OPERATION | SeekSG1 | SeekSG2 |

FIG.19

| TYPE OF OPERATION | PATTERN OF SERVO GATE |
|---|---|
| WRITE OPERATION | NomalSG3 |
| READ OPERATION | NomalSG3 |
| SEEK OPERATION | SeekSG3 |

MAGNETIC DISK DEVICE AND METHOD

CROSS-REFERENCE TO RELATED APPLICATIONS

This application is based upon and claims the benefit of priority from Japanese Patent Application No. 2022-126097, filed on Aug. 8, 2022; the entire contents of which are incorporated herein by reference.

FIELD

Embodiments described herein relate generally to a magnetic disk device and a method.

BACKGROUND

In a general magnetic disk device, a magnetic disk includes a plurality of servo areas in which servo information is written at intervals in a circumferential direction of the magnetic disk. Then, in the circumferential direction of the magnetic disk, an area between servo areas is set as a data area where data can be written.

BRIEF DESCRIPTION OF THE DRAWINGS

FIG. 8 is a schematic table for describing a relationship among the type of a servo sector, the type of an operation being executed, and a pattern of a servo gate to be used according to the first embodiment;

FIG. 19 is a schematic table for describing a relationship between the type of an operation being executed and a pattern of a servo gate to be used according to the second embodiment;

DETAILED DESCRIPTION

According to the present embodiment, a magnetic disk device includes a magnetic disk, a magnetic head, and a controller. A plurality of first servo sectors is arranged in the magnetic disk at intervals in the circumferential direction. The magnetic disk includes a plurality of data areas provided between two first servo sectors adjacent to each other in the circumferential direction. Each of the plurality of first servo sectors includes a first area and a second area. First information including a preamble, a servo mark, and a Gray code is written in the first area. The second area is disposed after the first area in a write and read direction along the circumferential direction, and second information including a burst pattern is written in the second area. The plurality of first servo sectors includes a plurality of second servo sectors and a plurality of third servo sectors. One or more third servo sectors of the plurality of third servo sectors are arranged between two adjacent second servo sectors of the plurality of second servo sectors. The circumferential length of a first area included in each of the plurality of third servo sectors is longer than the circumferential length of a first area included in each of the plurality of second servo sectors. The controller demodulates the first information and the second information when the magnetic head passes through one of the plurality of second servo sectors in write operation and demodulates the second information without demodulating the first information when the magnetic head passes through one of the plurality of third servo sectors. The write operation is an operation of writing data in one or more of the plurality of data areas using the magnetic head. The controller demodulates the first information and the second information when the magnetic head passes through one of the plurality of second servo sectors in read operation and demodulates the first information and the second information when the magnetic head passes through one of the plurality of third servo sectors. The read operation is an operation of reading data from one or more of the plurality of data areas using the magnetic head.

Hereinafter, a magnetic disk device and a method according to embodiments will be described in detail with reference to the accompanying drawings. Note that the present invention is not limited by these embodiments.

First Embodiment

Figure 1:
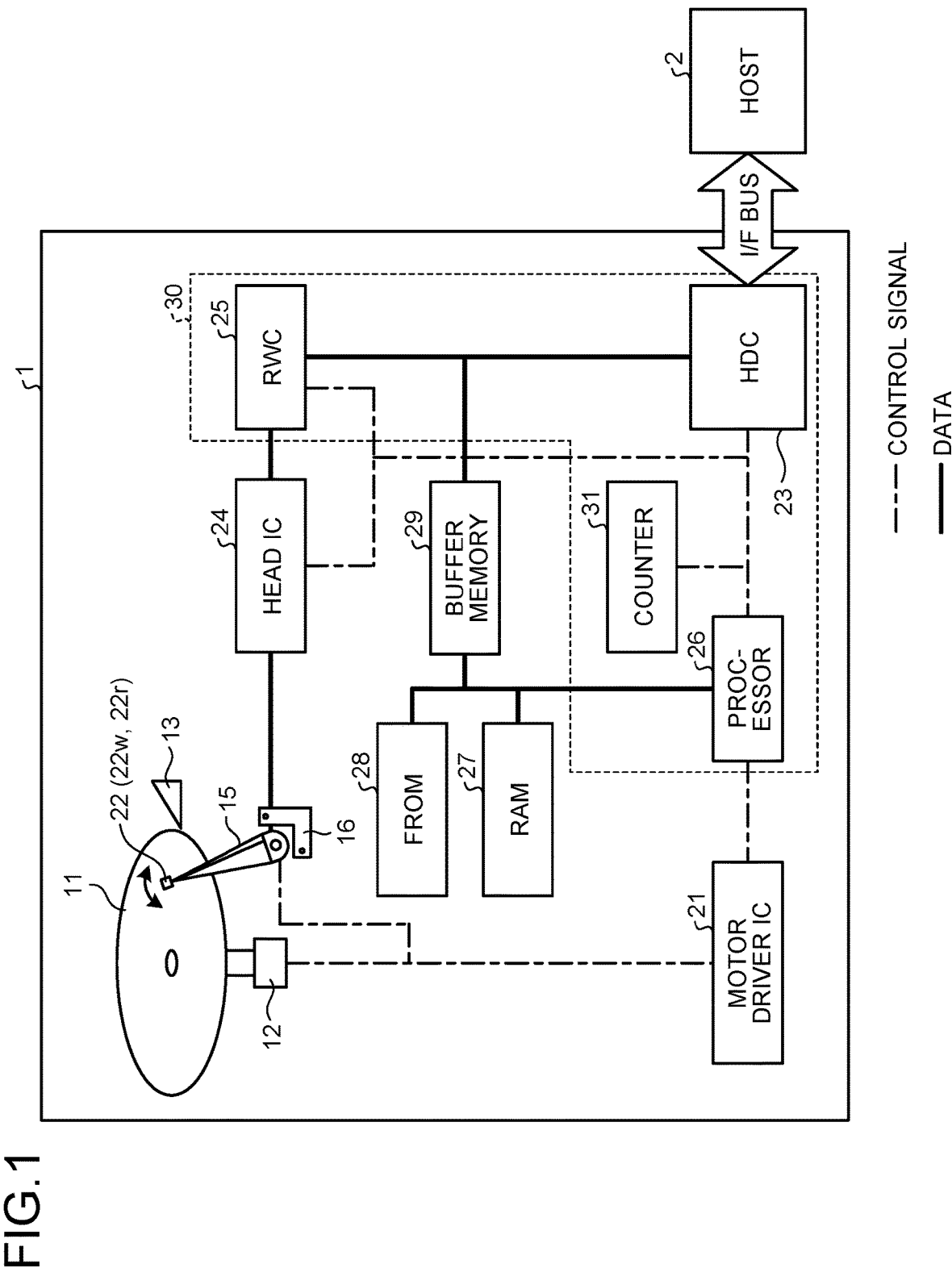
FIG. 1 is a schematic diagram illustrating an example of a configuration of a magnetic disk device according to a first embodiment.

FIG. 1 is a schematic diagram illustrating an example of a configuration of a magnetic disk device 1 according to a first embodiment.

The magnetic disk device 1 is connected to a host 2. The magnetic disk device 1 can receive an access command such as a write command or a read command from the host 2.

The magnetic disk device 1 includes a magnetic disk 11 having a magnetic layer formed on a surface thereof. The magnetic disk device 1 writes data to the magnetic disk 11 or reads data from the magnetic disk 11 in response to an access command.

Data is written and read via a magnetic head 22. Specifically, in addition to the magnetic disk 11, the magnetic disk device 1 includes a spindle motor 12, a ramp 13, an actuator arm 15, a voice coil motor (VCM) 16, a motor driver integrated circuit (IC) 21, the magnetic head 22, a hard disk controller (HDC) 23, a head IC 24, a read and write channel (RWC) 25, a processor 26, a RAM 27, a flash read only memory (FROM) 28, a buffer memory 29, and a counter 31.

The magnetic disk 11 is rotated at a predetermined rotation speed by a spindle motor 12 attached coaxially. The spindle motor 12 is driven by the motor driver IC 21.

The processor 26 controls the rotation of the spindle motor 12 and the rotation of the VCM 16 via the motor driver IC 21.

The magnetic head 22 writes and reads information to and from the magnetic disk 11 using a write head 22w and a read head 22r included therein. The magnetic head 22 is attached to a distal end of the actuator arm 15. The magnetic head 22 is moved in the radial direction of the magnetic disk 11 by the VCM 16 driven by the motor driver IC 21. Note that, as for the write head 22w and the read head 22r included in the magnetic head 22, a single magnetic head 22 may include a plurality of write heads 22w and/or read heads 22r.

For example, in cases like when the rotation of the magnetic disk 11 is stopped, the magnetic head 22 is moved to the ramp 13. The ramp 13 holds the magnetic head 22 at a position spaced apart from the magnetic disk 11.

The head IC 24 amplifies and outputs a signal read from the magnetic disk 11 by the magnetic head 22 during the read operation and supplies the read signal to the RWC 25. In addition, the head IC 24 amplifies a signal corresponding to data to be written that is supplied from the RWC 25 and supplies the amplified signal to the magnetic head 22 during the write operation.

The HDC 23 performs control of transmission and reception of data with the host 2 via an I/F bus, control of the buffer memory 29, error correction processing of read data, and others.

The buffer memory 29 is used as a buffer for data transmitted to and received from the host 2. For example, the buffer memory 29 is used to temporarily store data to be written or data read from the magnetic disk 11.

The buffer memory 29 includes, for example, a volatile memory capable of high-speed operation. The type of the memory included in the buffer memory 29 is not limited to a specific type. The buffer memory 29 may include, for example, a dynamic random access memory (DRAM), a static random access memory (SRAM), or a combination thereof. Note that the buffer memory 29 may include a desired non-volatile memory.

The RWC 25 modulates data to be written that is supplied from the HDC 23 and supplies the modulated data to the head IC 24. The RWC 25 also demodulates a signal read from the magnetic disk 11 and supplied from the head IC 24 and outputs the demodulated signal to the HDC 23 as digital data.

The processor 26 is, for example, a central processing unit (CPU). The RAM 27, the flash read only memory (FROM) 28, the buffer memory 29, and the counter 31 are connected to the processor 26.

The FROM 28 is a nonvolatile memory. The FROM 28 stores firmware (program data), various operation parameters, and others. Note that the firmware may be stored in the magnetic disk 11.

The RAM 27 includes, for example, a DRAM, an SRAM, or a combination thereof. The RAM 27 is used as an operation memory by the processor 26. The RAM 27 is used as an area in which the firmware is loaded and an area in which various types of management data are temporarily stored.

The processor 26 performs overall control of the magnetic disk device 1 in accordance with the firmware stored in the FROM 28 or the magnetic disk 11. For example, the processor 26 loads the firmware from the FROM 28 or the magnetic disk 11 to the RAM 27 and executes control of the motor driver IC 21, the head IC 24, the RWC 25, the HDC 23, and others in accordance with the loaded firmware.

The counter 31 is a timer circuit whose count value increases with time. The processor 26 uses the counter 31 in order to determine the timing of various operations. The type of the counter 31 is not limited to a specific type. In one example, the counter 31 may be a voltage-controlled oscillator (VCO) counter.

Note that a configuration including the HDC 23, the RWC 25, the processor 26, and the counter 31 can also be regarded as a controller 30. In addition to these components, the controller 30 may include other components (such as the RAM 27, the FROM 28, or the buffer memory 29). The counter 31 may be provided outside the controller 30.

Furthermore, the firmware program may be stored in the magnetic disk 11. Some or all of the functions of the processor 26 may be implemented by a hardware circuit such as a field-programmable gate array (FPGA) or an application specific integrated circuit (ASIC).

Figure 2:
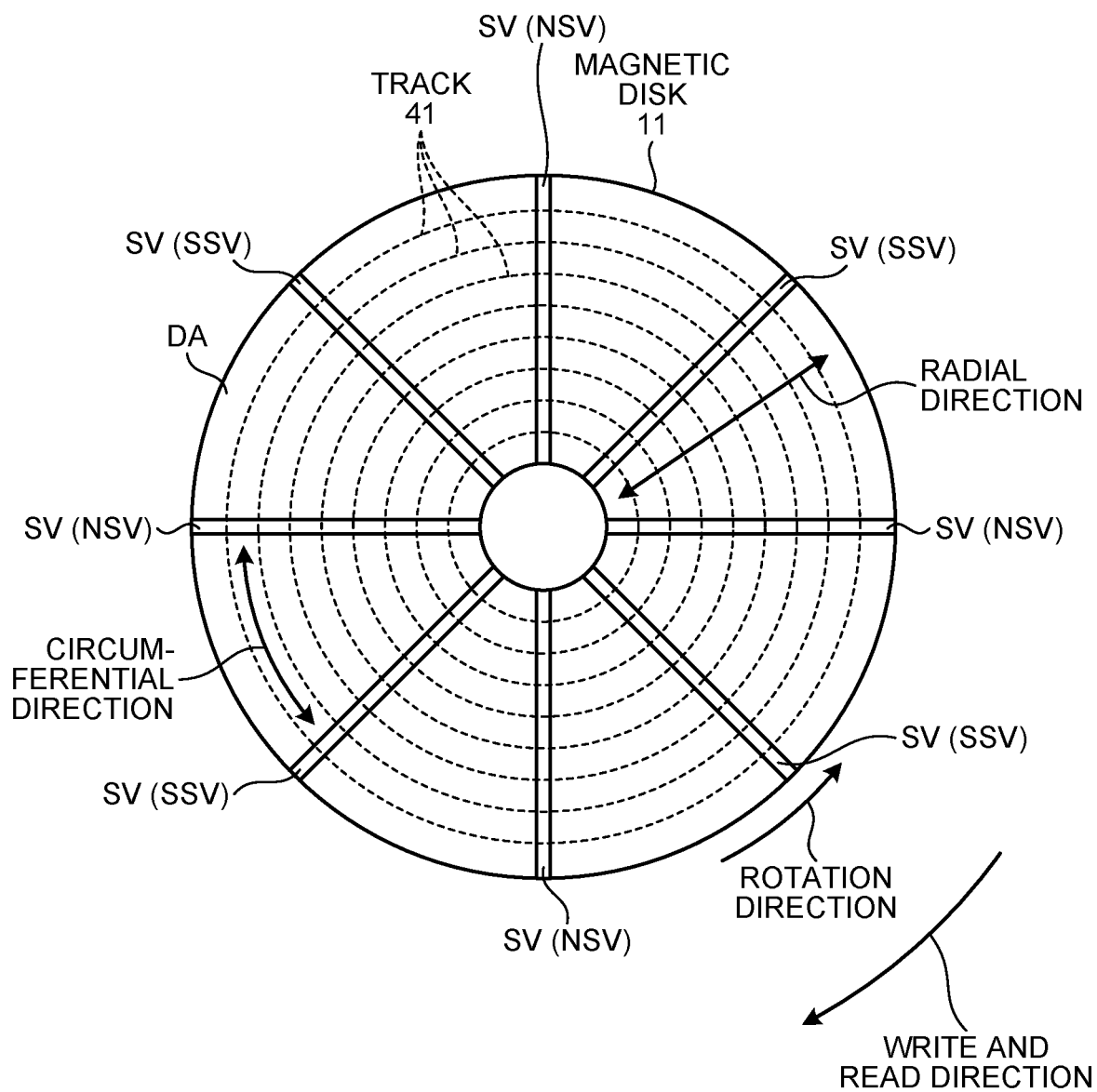
FIG. 2 is a schematic diagram illustrating an example of a configuration of a magnetic disk according to the first embodiment.

FIG. 2 is a schematic diagram illustrating an example of a configuration of the magnetic disk 11 according to the first embodiment. Note that this drawing illustrates an example of the rotation direction of the magnetic disk 11. The magnetic head 22 moves relative to the magnetic disk 11 by the rotation of the magnetic disk 11. Therefore, the write and read direction, that is, the direction in which data is written or read by the magnetic head 22 along the circumferential direction is opposite to the rotation direction of the magnetic disk 11.

Servo information used for positioning of the magnetic head 22 is written to the magnetic disk 11 by, for example, a servo writer or self-servo write (SSW) in the manufacturing process. According to FIG. 2, as an example of the arrangement of servo areas in which the servo information is written, a plurality of servo areas SV arranged radially and at predetermined intervals in the circumferential direction is drawn. A space between two servo areas SV consecutive in the circumferential direction is used as a data area DA in which data is written.

Note that data written in the data area DA includes user data received from the host 2, metadata (for example, error correction code) accompanying the user data, system data, and others.

The plurality of servo areas SV include a plurality of normal servo areas NSV and a plurality of short servo areas SSV. According to the example illustrated in FIG. 2, the normal servo areas NSV and the short servo areas SSV are alternately arranged in the circumferential direction. In other words, at least one or more short servo areas SSV are arranged between two normal servo areas NSV arranged consecutively in the circumferential direction, in other words, between two adjacent normal servo areas NSV.

A plurality of concentric tracks 41 is set in the radial direction of the magnetic disk 11. In a data area DA, a plurality of data sectors is continuously formed along each track 41. The servo information written in the servo areas SV is used for a seek operation of moving the magnetic head 22 toward a target track 41 and a tracking operation of maintaining the magnetic head 22 on a target track 41.

Hereinafter, an area divided by a normal servo area NSV on a track 41 is referred to as a normal servo sector NSV. An area divided by a short servo area SSV on a track 41 is referred to as a short servo sector SSV. In addition, the normal servo sectors NSV and the short servo sectors SSV are collectively referred to as servo sectors SV.

In addition, in a case where first data and second data are written along the write and read direction and the first data is written in an area to be read earlier than the second data, the direction as viewed from the area where the second data is written toward the area of the first data may be referred to as "preceding" or "ahead of" the area where the second data is written. Conversely, the direction as viewed from the area where the first data is written toward the area of the second data may be referred to as "subsequent" or "after" the area where the first data is written. In a case where it is described as "an immediately preceding second area" or "a second area disposed immediately ahead of" when a first area is focused on, "the immediately preceding second area" or "the second area disposed immediately ahead of" refers to a second area through which the magnetic head 22 last passes before the magnetic head 22 passes through the first area. In a case where it is described as "an immediately subsequent second area" or "a second area disposed immediately after" when a first area is focused on, "the immediately subsequent second area" or "the second area disposed immediately after" refers to a second area through which the magnetic head 22 first passes after the magnetic head 22 passes through the first area.

In addition, in the circumferential direction, a front end of a certain area may be referred to as the "start" of the area. Likewise, in the circumferential direction, a rear end of a certain area may be referred to as an "end" of the area.

Figure 3:
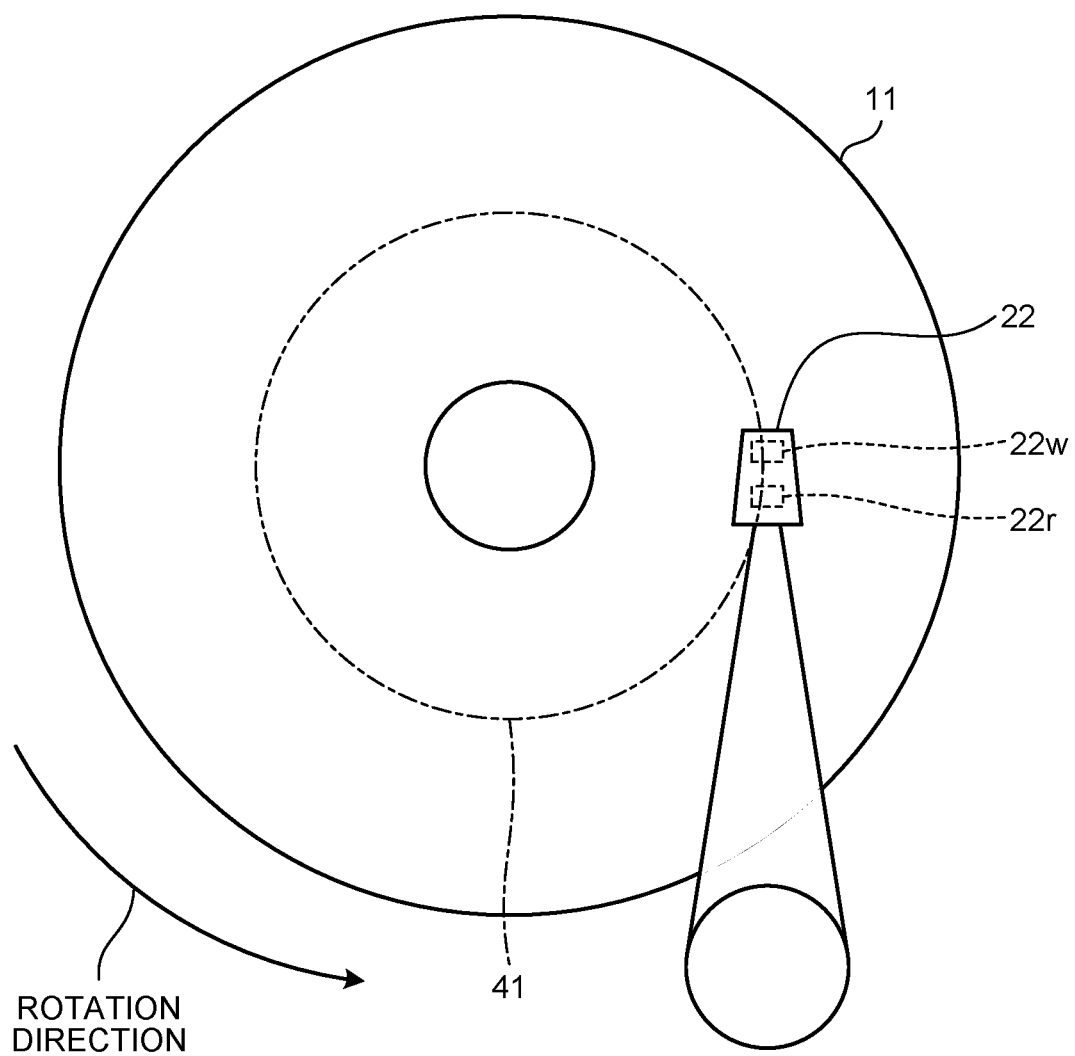
FIG. 3 is a diagram for describing an example of a positional relationship between a read head and a write head according to the first embodiment.

FIG. 3 is a diagram for describing an example of a positional relationship between the read head 22r and the write head 22w according to the first embodiment. According to the example illustrated in this drawing, the read head 22r and the write head 22w are arranged in a direction in which the actuator arm 15 extends. The read head 22r is disposed closer to the rotation axis of the actuator arm 15 than the write head 22w is. Then, in a state where the magnetic head 22 is positioned on a certain track 41, the write head 22w moves relative to the magnetic disk 11 behind the read head 22r.

That is, in the circumferential direction of the magnetic disk 11, there is a gap between the read head 22r and the write head 22w, and the write head 22w relatively moves with respect to the magnetic disk 11 in such a manner as to be delayed from the read head 22r by the gap. The length of the gap in the circumferential direction between the read head 22r and the write head 22w is referred to as a read-write gap length RWgap.

Note that the read-write gap length RWgap varies depending on the skew angle of the magnetic head 22. Moreover, the skew angle of the magnetic head 22 varies depending on the radial position of the magnetic head 22. That is, the read-write gap length RWgap varies depending on the radial position.

In the write operation of writing data to a data area of a target track, reading servo information from a servo area SV by the read head 22r and writing data to the data area DA by the write head 22w are executed temporally exclusively. However, since the write head 22w moves in the circumferential direction of the magnetic disk 11 behind the read head 22r by the read-write gap length RWgap, an area where data cannot be written may occur immediately before a servo sector SV in the circumferential direction. Such an area where data cannot be written is herein referred to as an unwritable area UA.

In order to minimize the total capacity of the unwritable area UA in the magnetic disk 11, the controller 30 does not read the servo information recorded in a front part of a short servo sector SSV during the write operation.

That is, in the write operation, the short servo sectors SSV and the normal servo sectors NSV are configured so that the length of a section in a short servo sector SSV where the servo information is read is shorter than the length of a section in a normal servo sector NSV where the servo information is read. Moreover, in the write operation, the short servo sector SSV and the normal servo sector NSV are configured in such a manner that the front part of the short servo sector SSV is not read.

Even when the read head 22r reaches a short servo sector SSV in the write operation, the controller 30 can write data until the read head 22r reaches a rear part of the short servo sector SSV, and thus the length of the unwritable area UA present immediately before the short servo sector SSV can be suppressed. As a result, the total capacity of the unwritable areas UA in the magnetic disk 11 can be suppressed.

Note that the servo information recorded in the front part of the short servo sector SSV is read in the seek operation and the read operation. The seek operation is an operation of moving the magnetic head 22 in the radial direction toward a target track 41. The read operation is an operation of reading data from a data area DA.

Although the lengths of the unwritable areas UA present immediately before the short servo sectors SSV can be suppressed by the implementation of the short servo sectors SSV, there are cases where the unwritable areas UA immediately before the short servo sectors SSV cannot be completely eliminated. In the first embodiment, with the configuration of the servo information recorded in the short servo sectors SSV being devised, the lengths of the unwritable areas UA present immediately before the short servo sectors SSV are further suppressed. Hereinafter, a specific example of the configuration of the normal servo sectors NSV and the short servo sectors SSV will be described.

Figure 4:
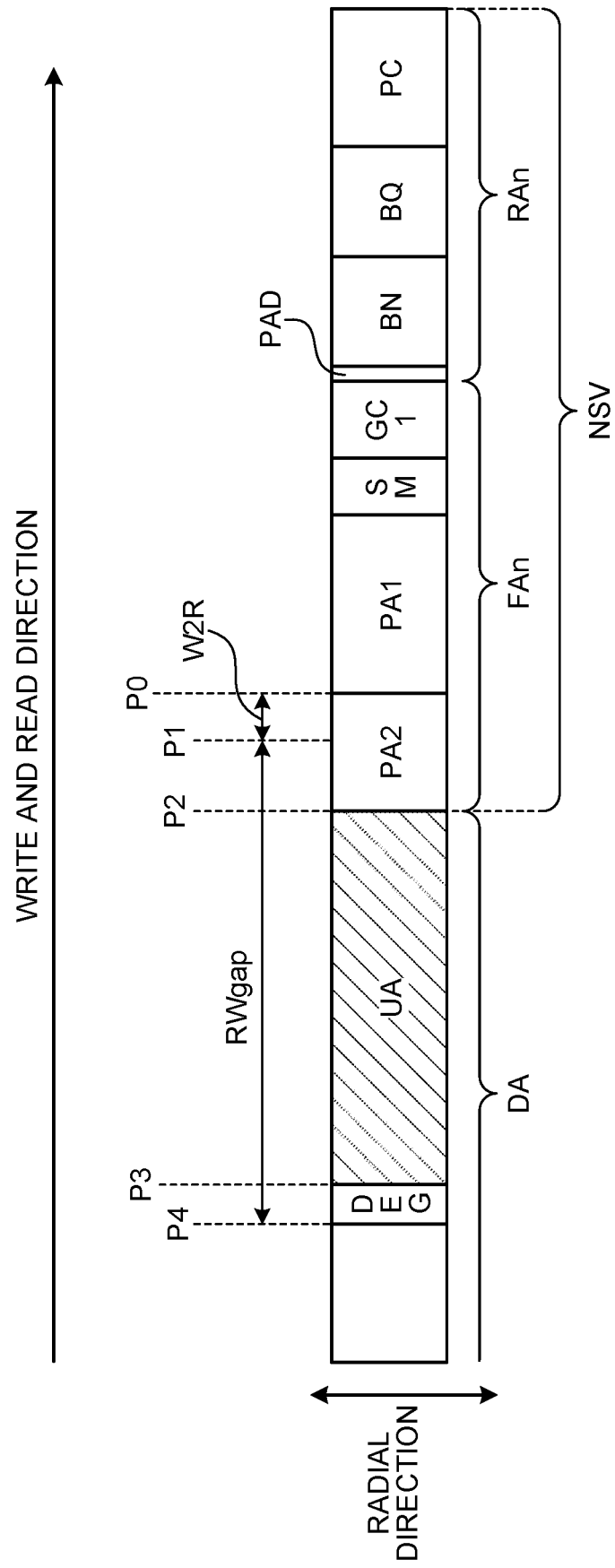
FIG. 4 is a diagram illustrating an example of a configuration of a normal servo sector according to the first embodiment.

FIG. 4 is a diagram illustrating an example of the configuration of a normal servo sector NSV according to the first embodiment. In this example, in the normal servo sector NSV, a preamble area PA2 in which a preamble #2 is written, a preamble area PA1 in which a preamble #1 is written, a servo mark area SM in which a servo mark is written, a Gray code area GC1 in which a Gray code is written, a pad area PAD in which a PAD is written, a burst area BN in which an N burst is written, a burst area BQ in which a Q burst is written, and a post code area PC in which a post code is written are arranged in the order mentioned in the write and read direction.

The preamble #1 and the preamble #2 are information having a structure of a pattern of a single period that periodically changes in the circumferential direction. The preamble #1 and the preamble #2 are used to adjust the amplitude, the phase, and the frequency of sampling data when a servo waveform read by the read head 22r is taken into the RWC 25 as the sampling data on the basis of a servo clock.

During the read operation and the write operation, the preamble #2 is not read, and only the preamble #1 is read. During the seek operation, in order to suppress deterioration in accuracy of servo waveform sampling data due to high-speed movement of the magnetic head 22 in the radial direction, the preamble #2 is also read in addition to the preamble #1.

The servo mark is pattern data indicating the start of servo information. The controller 30 determines the timing to ingest various types of servo information after the detection timing of the servo mark.

Note that, although details will be described later, a servo mark is written also in a short servo sector SSV. That is, a servo mark is written in each of the servo sectors SV regardless of whether the servo sector SV is a normal servo sector NSV or a short servo sector SSV. The intervals between the positions where the servo marks are written are constant in the circumferential direction. Note that the intervals between the positions where the servo marks are written may not be constant in the circumferential direction.

A Gray code includes a cylinder address for identifying each track 41 included in the magnetic disk 11 and a sector address for identifying each of the servo sectors SV on the track 41.

The PAD indicates a boundary between the Gray code area GC1 and the burst area BN.

The N burst and the Q burst are pattern data used to detect the amount of positional deviation of the center of the track 41 indicated by a track number included in a Gray code #1. The N burst and the Q burst are examples of burst data. The cylinder address included in the Gray code is given as, for example, an integer value, and it is possible to obtain an offset amount of a decimal point based on the position indicated by the cylinder address by demodulating the N burst and the Q burst. That is, the current position of the magnetic head 22 is obtained by demodulating the N burst and the Q burst. The current position of the magnetic head 22 is the position of the magnetic head 22 on the magnetic disk 11 at the timing when the servo information is demodulated. The current position of the magnetic head 22 obtained by demodulating the N burst and the Q burst is referred to as a demodulation position.

The post code indicates a correction amount of a positional deviation of the shape of the track 41 defined by the Gray code, the N burst, and the Q burst from the shape of an ideal track 41. The degree of this positional deviation varies in synchronization with the rotation of the magnetic disk 11. Therefore, the positional deviation is also referred to as repeatable runout (RRO). That is, the post code is used to correct the RRO.

The preamble area PA2, the preamble area PA1, the servo mark area SM, and the Gray code area GC1 of the servo sector SV are referred to as a front area FA in the sense of an area of a front part of the servo sector SV. An area after the area FA in the servo sector SV is referred to as a rear area RA in the sense of an area after the servo sector SV.

That is, servo information (first information) including the preambles, the servo mark, and the Gray code is written in the front area. In the rear area, servo information (second information) including the burst patterns is written.

Note that the front area FA of the normal servo sector NSV is denoted as a front area FAn. A rear area RA of the normal servo sector NSV is denoted as a rear area RAn.

In the write operation, the controller 30 reads the servo information from an area after the preamble area PA1 in the normal servo sector NSV. It takes a predetermined period of time to switch the mode of the magnetic head 22 from a write mode, which is a mode in which writing is possible, to a read mode, which is a mode in which reading is possible, and the magnetic head 22 continues to move in the circumferential direction during the switching. The distance that the magnetic head 22 moves during the period of switching from the mode of writing data to the mode of reading data is referred to as a write-read transition length (write-read transition length W2R in FIG. 4). That is, in a case where data is written to the data area DA and servo information is read from the servo area SV next time, a margin equal to or longer than at least the write-read transition length W2R is required between the position where the data writing is ended and the position where the servo information reading is started.

In addition, after the end of writing to the data area DA, degaussing of causing a write current, which attenuates at a certain frequency over a predetermined period of time, to flow through the write head 22w is performed. It becomes impossible to write significant data during the degaussing. The length of an area where the degaussing is performed is referred to as a degaussing length $L_{DEG}$.

In FIG. 4, writing of data to the data area DA is stopped at timing when the read head 22r reaches a position P1 separated from the start position P0 of the preamble area PA1 by the write-read transition length W2R in an opposite direction of the write and read direction. At timing when the writing is stopped, the write head 22w is located at a position P4 separated from the position P1 in the opposite direction of the write and read direction by the read-write gap length RWgap. When the write head 22w reaches the position P4, data writing is stopped, and degaussing is started. Then, the degaussing is executed until the write head 22w reaches a position P3 separated from the position P4 in the write and read direction by the degaussing length $L_{DEG}$.

Therefore, in the example illustrated in FIG. 4, it can be seen that an area from the position P3 to a start position P2 of the preamble area PA2 corresponds to an unwritable area UA.

Figure 5:
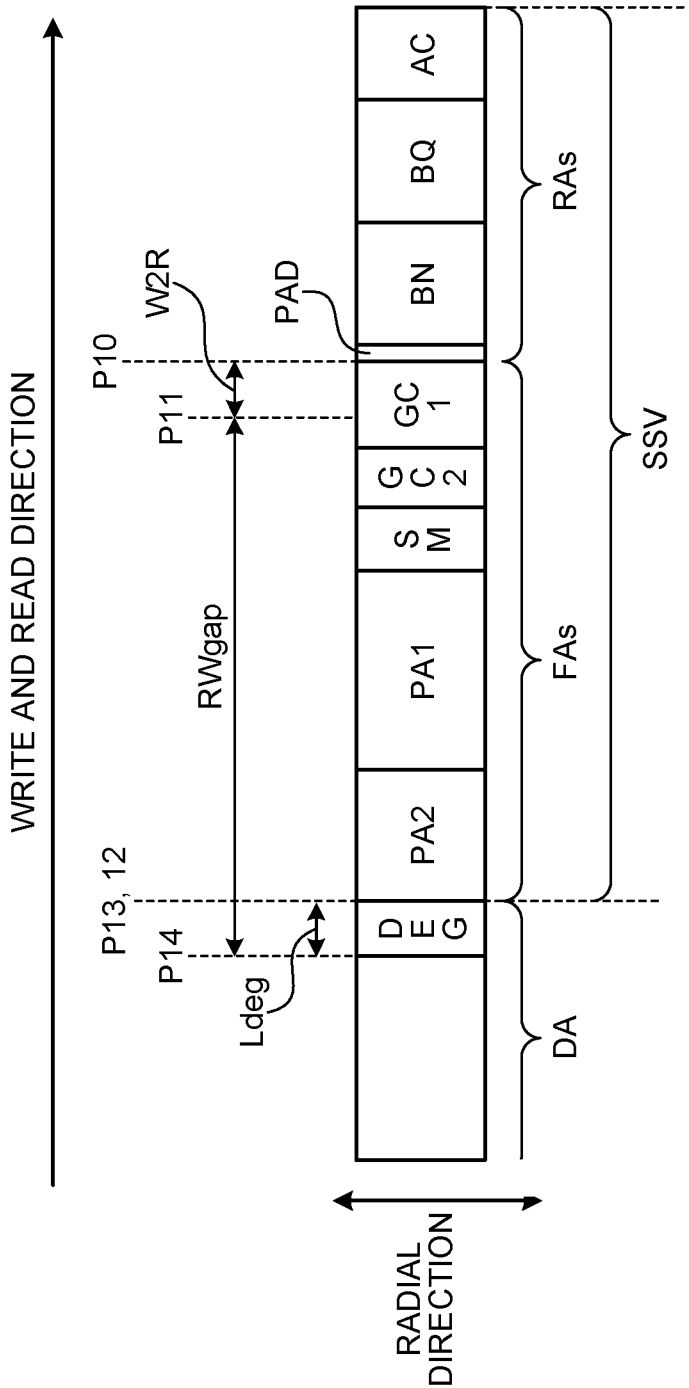
FIG. 5 is a diagram illustrating an example of a configuration of a short servo sector according to the first embodiment.

FIG. 5 is a diagram illustrating an example of the configuration of a short servo sector SSV according to the first embodiment. In this example, in the short servo sector SSV, a preamble area PA2 in which a preamble #2 is written, a preamble area PA1 in which a preamble #1 is written, a servo mark area SM in which a servo mark is written, a Gray code area GC2 and a Gray code area GC1 in which a Gray code is written, a pad area PAD in which a PAD is written, a burst area BN in which an N burst is written, a burst area BQ in which a Q burst is written, and an additional code area AC in which an additional code is written are arranged in the order mentioned in the write and read direction.

That is, the configuration of the short servo sector SSV is different from the configuration of the normal servo sector NSV in that the Gray code area GC2 is added to a front area FA and that the additional code area AC is included in the rear area RA instead of the post code area PC. Note that the additional code area AC may not be included.

Note that a front area FA of the short servo sector SSV is denoted as a front area FAs. A rear area RA of the short servo sector SSV is denoted as a rear area RAs.

In the short servo sector SSV, the length of the front area FA is longer than that of the normal servo sector NSV by the amount of the Gray code area GC2 added to the front area FA.

In the write operation, the controller 30 reads the servo information from the rear area RAs without reading the servo information in the front area FAs. That is, the controller 30 starts reading the servo information from the timing when the read head 22r reaches a start position P10 of the rear area RAs. Therefore, the controller 30 stops writing data to a data area DA at timing when the read head 22r reaches a position P11 separated from the start position P10 of the rear area RAs in the opposite direction of the write and read direction by the write-read transition length W2P.

At timing when the data writing is stopped, the write head 22w is located at a position P14 separated from the position P11 in the opposite direction of the write and read direction by the read-write gap length RWgap. When the write head 22w reaches the position P14, data writing is stopped, and degaussing is started. Then, the degaussing is executed until the write head 22w reaches a position P13 separated from the position P14 in the write and read direction by the degaussing length $L_{DEG}$.

That is, the distance (P13−P10) between the position P13 and the start position P10 of the rear area RAs can be obtained according to the following Equation (1).

$$P13-P10=W2R+RWGap-L_{DEG} \quad (1)$$

On the other hand, the distance (P12−P10) between the start position P12 of the preamble area PA2 and the start position P10 of the rear area RAs can be obtained according to the following Equation (2). Note that, in the following Equation (2), $L_{PA2}$ represents the length of the preamble area PA2, $L_{PA1}$ represents the length of the preamble area PA1, $L_{SM}$ represents the length of the servo mark area SM, $L_{GC2}$ represents the length of the Gray code area GC2, and $L_{GC1}$ represents the length of the Gray code area GC1.

$$P12-P10=L_{PA2}+L_{PA1}+L_{SM}+L_{GC2}+L_{GC1} \quad (2)$$

In the case illustrated in FIG. 5, the distance (P13−P10) and the distance (P12−P10) are equal. Therefore, there is no unwritable area UA.

Here, technology to be compared with the embodiment will be described. The technology compared with the embodiment is referred to as a comparative example.

According to the comparative example, a front area of a short servo sector has a similar configuration to that of the front area FAn of the normal servo sector NSV. That is, a front area according to the comparative example has a configuration in which the Gray code area GC2 is omitted from the front area FAs illustrated in FIG. 5. In such a case, the distance (P12'−P10) between a start position P12' of the preamble area PA2 and a start position P10 of the rear area can be obtained according to the following Equation (3). However, the lengths of the preamble areas PA2, the lengths of the preamble areas PA1, the lengths of the servo mark areas SM, and the lengths of the Gray code areas GC1 are equal between the comparative example and the embodiment.

$$P12'-P10=L_{PA2}+L_{PA1}+L_{SM}+L_{GC1} \quad (3)$$

From Equations (2) and (3), it can be seen that the distance (P12'−P10) in the comparative example is shorter than the distance (P12−P10) in the embodiment by the length $L_{GC2}$ of the Gray code area GC2. That is, according to the comparative example, there is a space between the position P13 where the degaussing ends and the start position P12' of the preamble area PA2, and this space is the unwritable area UA immediately before the short servo sector SSV.

According to the embodiment, the length of the unwritable area UA immediately before the short servo sector SSV can be reduced by the length $L_{GC2}$ of the Gray code area GC2 as compared with the comparative example. As a result, the total capacity of unwritable areas UA in the magnetic disk 11 can be reduced.

Furthermore, according to the embodiment, as is clear from Equation (1), the position P13 at which the degaussing ends does not depend on the length $L_{GC2}$ of the Gray code area GC2. That is, the position P13 at which the degaussing ends is equivalent between the embodiment and the comparative example. Therefore, according to the embodiment, the total capacity of the unwritable areas UA can be suppressed without deteriorating the format efficiency.

Note that, in the example illustrated in FIG. 5, the position P13 at which the degaussing ends coincides with the start position P12 of the preamble area PA2. The position P13 at which the degaussing ends and the start position P12 of the preamble area PA2 do not necessarily have to coincide with each other, and an unwritable area UA having a slight length in the circumferential direction may exist between the position P13 at which the degaussing ends and the start position P12 of the preamble area PA2.

For example, it is conceivable to make the length $L_{GC2}$ of the Gray code area GC2 common to all the tracks 41 in the magnetic disk 11. In such a case, the designer may set the length $L_{GC2}$ of the Gray code area GC2 on the basis of the minimum value of the read-write gap length RWgap in the magnetic disk 11. Specifically, the designer may determine the length $L_{GC2}$ of the Gray code area GC2 in such a manner that the distance (P13−P10) is equal to the distance (P12−P10) at a radial position where the read-write gap length RWgap has the minimum value. In a case where the length $L_{GC2}$ of the Gray code area GC2 is determined by this manner, at a radial position where the read-write gap length RWgap is not the minimum value, a space is generated between the position P13 where the degaussing ends and the start position P12 of the preamble area PA2, and this space is an unwritable area UA.

Alternatively, the designer may determine the length $L_{GC2}$ of the Gray code area GC2 in such a manner that the distance (P13−P10) is slightly greater than the distance (P12−P10) at a radial position where the read-write gap length RWgap has the minimum value. In a case where the length $L_{GC2}$ of the Gray code area GC2 is determined in this manner, an unwritable area UA is generated at any radial position, and the length of the unwritable area UA is minimized at the radial position where the read-write gap length RWgap has the minimum value.

Note that the designer may vary the lengths $L_{GC2}$ of the Gray code areas GC2 in the tracks 41 depending on the radial position so that the distance (P13–P10) and the distance (P12–P10) are equal at any radial position. In a case where the lengths $L_{GC2}$ of the Gray code areas GC2 in the tracks 41 are determined by such a manner, it is possible to eliminate the unwritable areas UA immediately before the short servo sectors SSV at any radial position.

As described above, an additional code area AC is included in a rear area RAs of a short servo sector SSV.

In the write operation, the timing at which the N burst and the Q burst are demodulated from the rear area RAs of the short servo sector SSV is determined on the basis of an elapsed time with reference to the timing at which the servo mark is detected in an immediately preceding normal servo sector NSV instead of the servo mark written in the short servo sector SSV itself. The elapsed time is counted by the counter 31, and an error included in a count value increases as the count value of the counter 31 increases. Therefore, in the short servo sector SSV, due to the error included in the count value, the timing of demodulating the N burst and the Q burst is shifted from originally intended timing, which may cause an unusual detection in which the demodulation position is greatly shifted from an actual position. The additional code written in the additional code area AC is data for correcting the demodulation position obtained from the unusual detection.

Figure 6:
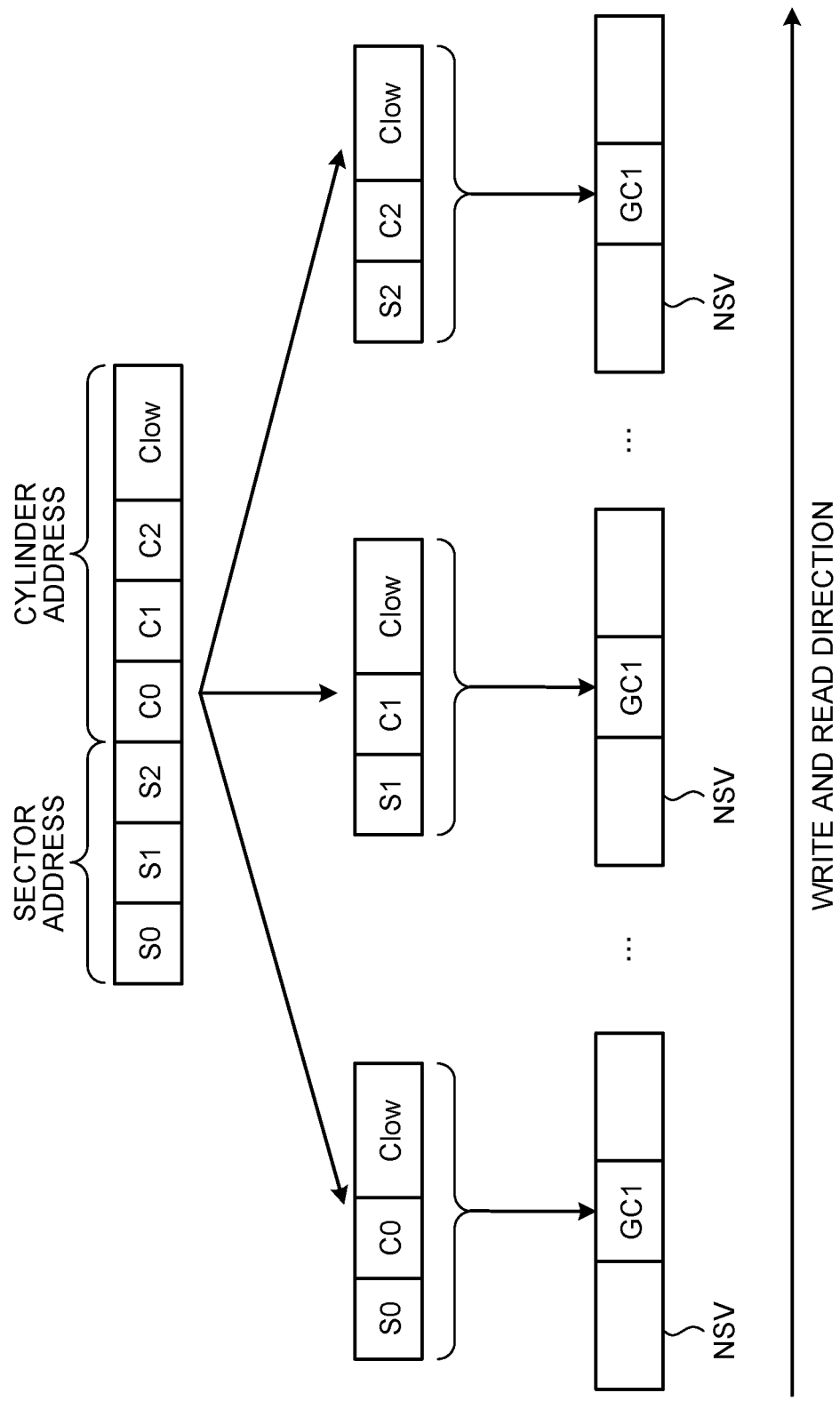
FIG. 6 is a schematic diagram for describing a Gray code written in a Gray code area of a normal servo sector according to the first embodiment.

FIG. 6 is a schematic diagram for describing a Gray code written in a Gray code area GC1 of a normal servo sector NSV according to the first embodiment.

In the example illustrated in FIG. 6, a full Gray code includes a full sector address on a higher order side and a full cylinder address on a lower order side. The full sector address has a data structure including a bit S0, a bit S1, and a bit S2 from the higher order side. The full cylinder address has a data structure including a bit C0, a bit C1, a bit C3, and a bit string Clow from the higher order side.

The full sector address S0 to S2 are divided into three, and the bit strings C0 to C2 on the higher order side of the full cylinder address are divided into three. Then, the bit S0, the bit C0, and the bit string Clow are written in the Gray code area GC1 of a heading normal servo sector NSV among three normal servo sectors NSV arranged consecutively in the write and read direction from the higher order side. The bit S1, the bit C1, and the bit string Clow are written in the Gray code area GC1 of a second normal servo sector NSV among the three normal servo sectors NSV from the higher order side. The bit S2, the bit C2, and the bit string Clow are written in the Gray code area GC1 of a normal servo sector NSV at the end among the three normal servo sectors NSV from the higher order side.

That is, in the embodiment, a complete Gray code is distributed to three normal servo sectors NSV. As a result, the length $L_{GC1}$ of the Gray code area GC1 can be reduced, and the format efficiency can be improved. Instead, the controller 30 needs to demodulate Gray codes from the three consecutively-arranged normal servo sectors NSV in order to obtain the full sector address and the full cylinder address. For example, at the time of the seek operation, unless all the Gray codes can be demodulated without errors from all the three consecutively-arranged normal servo sectors NSV, the full cylinder address cannot be determined.

Figure 7:
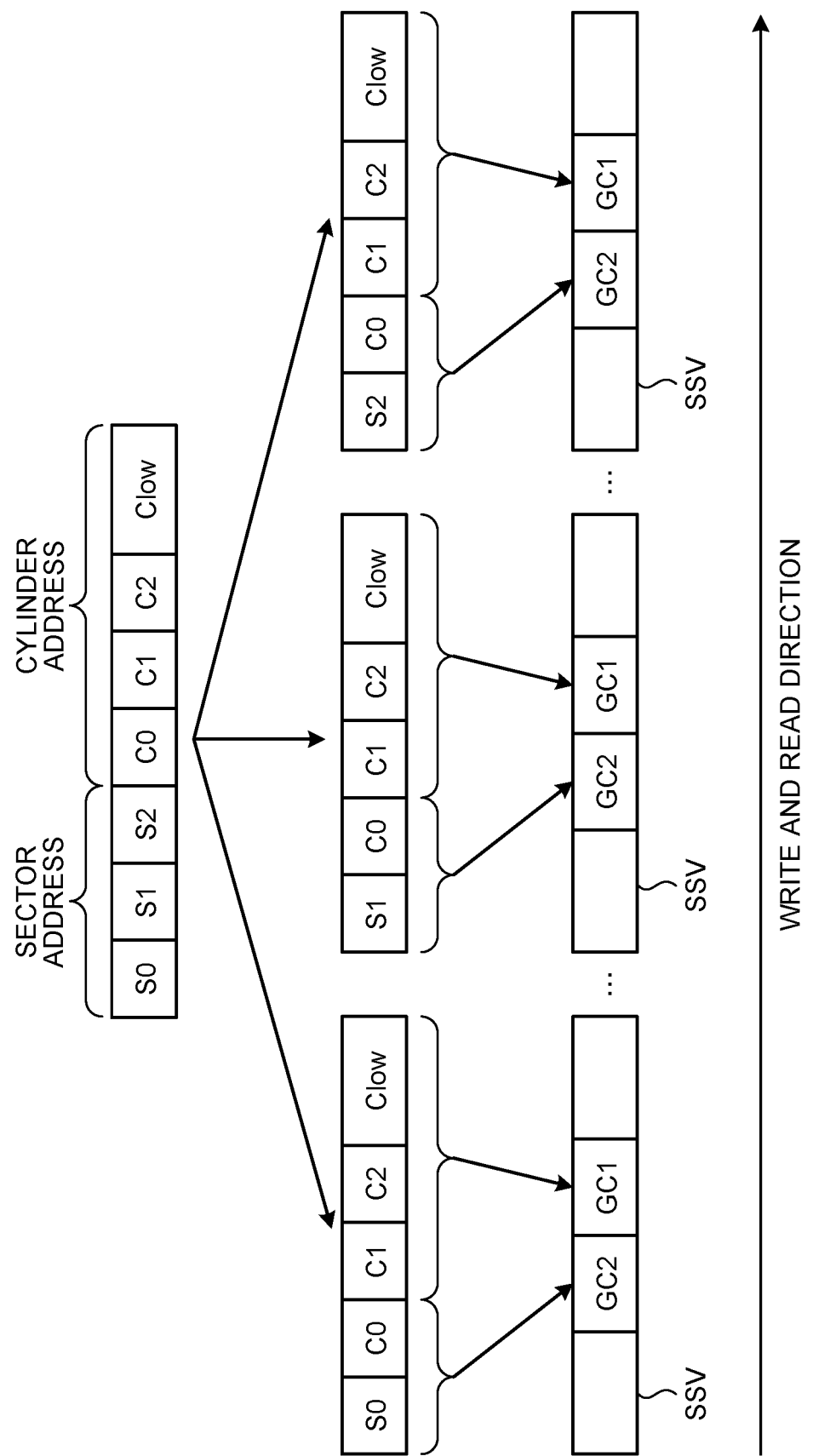
FIG. 7 is a schematic diagram for describing Gray codes written in Gray code areas of short servo sectors according to the first embodiment.

FIG. 7 is a schematic diagram for describing Gray codes written in Gray code areas GC1 and GC2 of short servo sectors SSV according to the first embodiment.

In the example illustrated in FIG. 7, the full sector address S0 to S2 are divided into three, and the full cylinder address is not divided. Then, in a heading short servo sector SSV among the three short servo sectors SSV consecutively arranged in the write and read direction, the bit S0 and the bit C0 are written in a Gray code area GC2 from the higher order side, and the bit C1, the bit C2, and the bit string Clow are written in a Gray code area GC1 from the higher order side. In a second short servo sector SSV among the three short servo sectors SSV, the bit S1 and the bit C0 are written in a Gray code area GC2 from the higher order side, and the bit C1, the bit C2, and the bit string Clow are written in the Gray code area GC1 from the higher order side. In a short servo sector SSV in the end among the three short servo sectors SSV, the bit S2 and the bit C0 are written in a Gray code area GC2 from the higher order side, and the bit C1, the bit C2, and the bit string Clow are written in a Gray code area GC1 from the higher order side.

Since the Gray codes are written as described above, the controller 30 can obtain the full cylinder address from any of the short servo sectors SSV. If the Gray codes can be demodulated from one short servo sector SSV without errors, the full cylinder address is determined, and thus the frequency of occurrence of seek errors can be reduced.

In addition, at the time of the read operation, the controller 30 can promptly complete the determination as to whether or not the full cylinder address has been determined, and thus the read performance can be improved.

Note that the writing methods of the Gray codes described in FIGS. 6 and 7 are examples. In a case where the length $L_{GC2}$ of the Gray code area GC2 can be set to be further longer, the full Gray code may be written in the Gray code areas GC1 and GC2 of each of the short servo sectors SSV. In such a case, since the controller 30 can obtain the full Gray code from each of the short servo sectors SSV in the read operation, the speed required for positioning in the read operation is shortened.

That is, in the first embodiment, the amount of information of the Gray code obtained from a short servo sector SSV is greater than the amount of information of the Gray code obtained from a normal servo sector NSV. Furthermore, according to the first embodiment, the amount of information of the Gray code obtained from a short servo sector SSV is greater than that of the comparative example in which the Gray code area GC2 is not included in the front area. Therefore, the read performance is improved as compared with the comparative example. That is, a magnetic disk device with high performance can be obtained. In addition, the frequency of occurrence of seek errors is reduced as compared with the comparative example, and a magnetic disk device with high performance can be obtained.

The controller 30 generates a write gate that is an internal signal indicating a period during which writing to a data area DA is performed, a read gate that is an internal signal indicating a period during which reading from the data area DA is performed, and a servo gate that is an internal signal indicating timing of reading the servo information and operates on the basis of these generated internal signals.

More specifically, when the magnetic head 22 passes through a certain servo sector SV, the processor 26 notifies the HDC 23 and the RWC 25 of the type of the servo sector SV and the type of the operation being executed. The HDC 23 controls the write gate, the read gate, and the servo gate on the basis of the type of the servo sector SV notified from the processor 26 and the type of the operation being executed. The RWC 25 causes the head IC 24 to execute reading and writing of user data and demodulation of the servo information on the basis of the write gate, the read gate, the servo gate, and the notification from the processor 26.

The controller 30 selectively uses five patterns of servo gates on the basis of the type of the servo sector SV and the type of the operation being executed.

FIG. 8 is a schematic table for describing a relationship among the type of the servo sector SV, the type of the operation being executed, and a pattern of the servo gate to be used according to the first embodiment.

When the magnetic head 22 passes through a normal servo sector NSV in the write operation and the read operation, a servo gate having a waveform of a pattern NormalSG1 is used. When the magnetic head 22 passes through a normal servo sector NSV in the seek operation, a servo gate having a pattern SeekSG1 is used.

When the magnetic head 22 passes through a short servo sector SSV in the write operation, a servo gate of a pattern ShortSG is used. When the magnetic head 22 passes through a short servo sector SSV in the read operation, a servo gate of a pattern NormalSG2 is used. When the magnetic head 22 passes through a short servo sector SSV in the seek operation, a servo gate having a pattern SeekSG2 is used.

Figure 9:
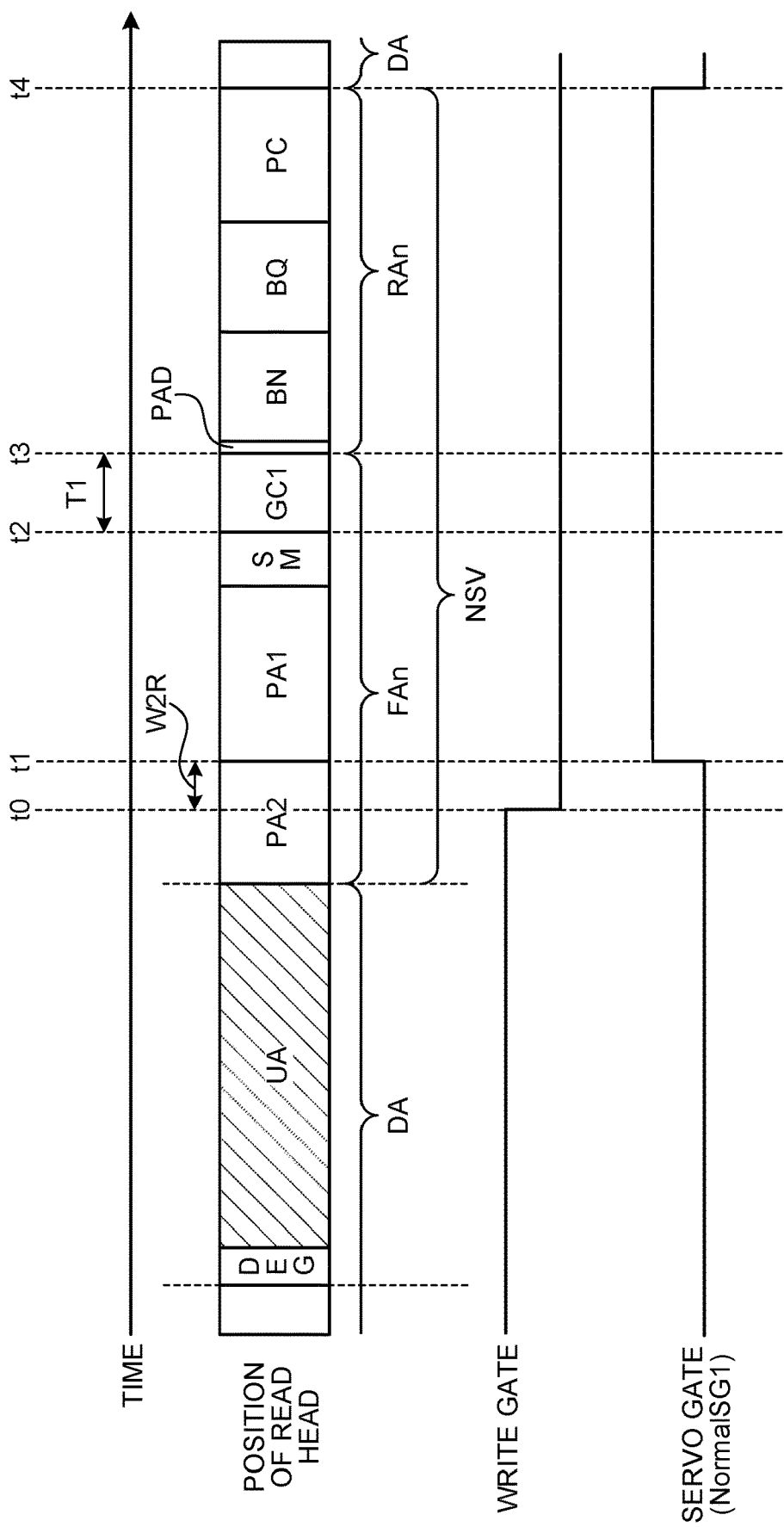
FIG. 9 is a schematic diagram for describing an example of a waveform of a servo gate of a pattern NormalSG1 used when a magnetic head passes through a normal servo sector in the write operation of the first embodiment.

FIG. 9 is a schematic diagram for describing an example of a waveform of a servo gate of the NormalSG1 pattern used when the magnetic head 22 passes through a normal servo sector NSV in the write operation of the first embodiment. In FIG. 9, the temporal transition of the position of the read head 22r in the circumferential direction is drawn. The relationship among the position of the read head 22r, the state of the write gate, and the state of the servo gate is further drawn.

When the read head 22r reaches a position separated from the start position of the preamble area PA1 in the opposite direction of the write and read direction by the write-read transition length W2R (time t0), the HDC 23 prohibits writing of data by deasserting the write gate.

When the read head 22r reaches the start position of the preamble area PA1 (time t1), the HDC 23 asserts the servo gate.

The RWC 25 demodulates the servo information in a period in which the servo gate is asserted. When detecting the servo mark in the period in which the servo gate is asserted (time t2), the RWC 25 interprets a signal read by the read head 22r and supplied from the head IC 24 in a period T1 from time t2 to time t3 as a Gray code and demodulates the signal. The period T1 is a known period of time required for the magnetic head 22 to pass through the Gray code area GC1. The period T1 is stored in advance in a desired storage device inside the RWC 25 or outside the RWC 25 in association with the normal servo sector NSV. When the processor 26 notifies that the type of the servo sector SV to pass through is the normal servo sector NSV, the RWC 25 specifies the period T1 that is a period associated with the normal servo sector NSV and demodulates and acquires the signal acquired from the time t2 until the period T1 elapses as the Gray code.

After the time t3, when the read head 22r reaches the end position of the post code area PC (time t4), the HDC 23 deasserts the servo gate.

Figure 10:
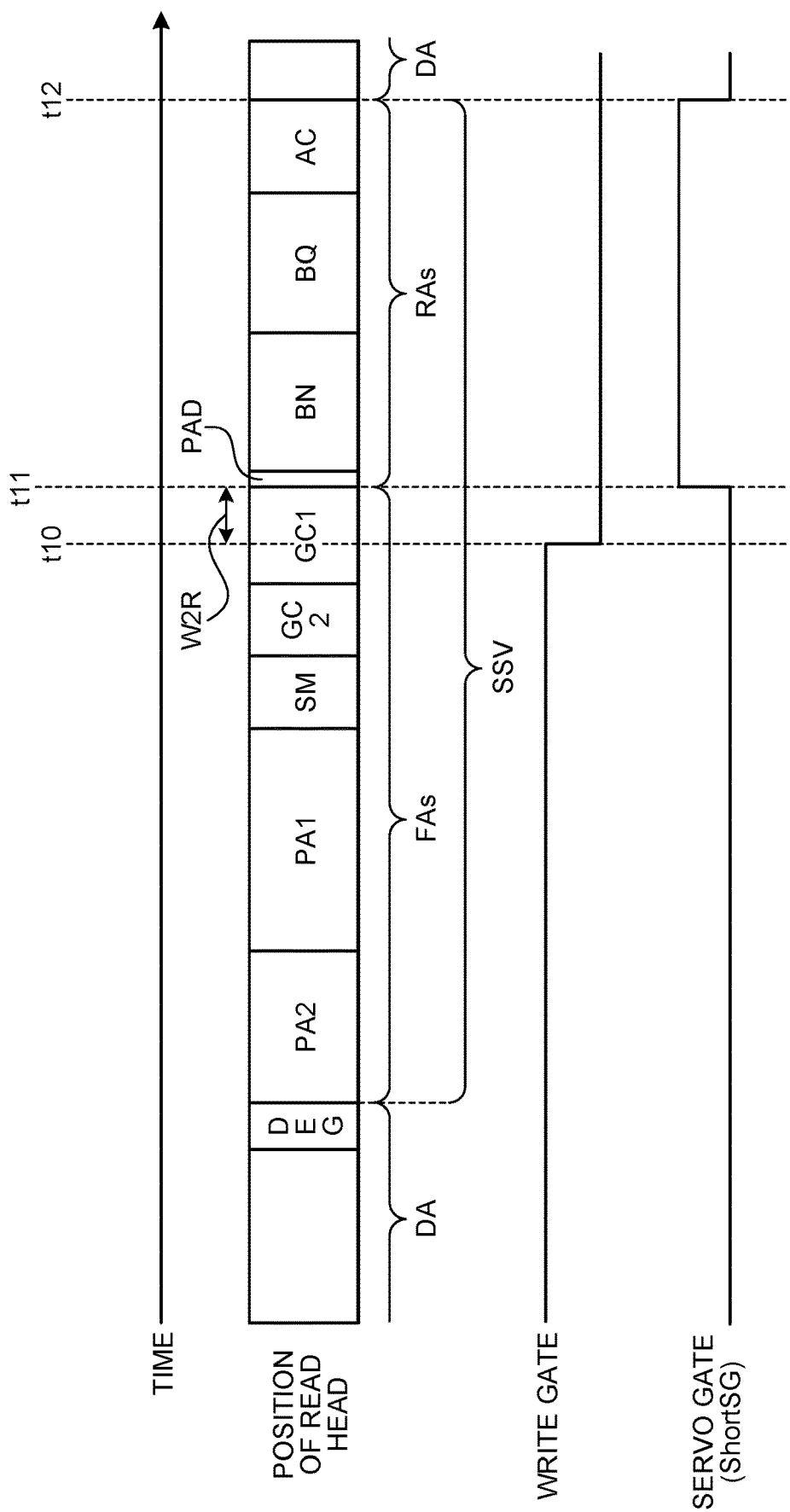
FIG. 10 is a schematic diagram for describing an example of a waveform of a servo gate of a pattern ShortSG used when the magnetic head passes through a short servo sector in the write operation of the first embodiment.

FIG. 10 is a schematic diagram for describing an example of a waveform of a servo gate of the pattern ShortSG used when the magnetic head 22 passes through a short servo sector SSV in the write operation of the first embodiment.

When the read head 22r reaches a position separated from the start position of the rear area RAs in the opposite direction of the write and read direction by the write-read transition length W2R (time t10), the HDC 23 prohibits writing of data by deasserting the write gate.

When the read head 22r reaches the start position of the rear area RAs (time t11), the HDC 23 asserts the servo gate.

When the read head 22r reaches the end position of the rear area RAs, that is, the end position of the additional code area AC (time t12), the HDC 23 deasserts the servo gate.

Since the servo gate of the pattern ShortSG is configured in this manner, the controller 30 acquires no Gray codes when the magnetic head 22 passes through the short servo sector SSV in the write operation.

Figure 11:
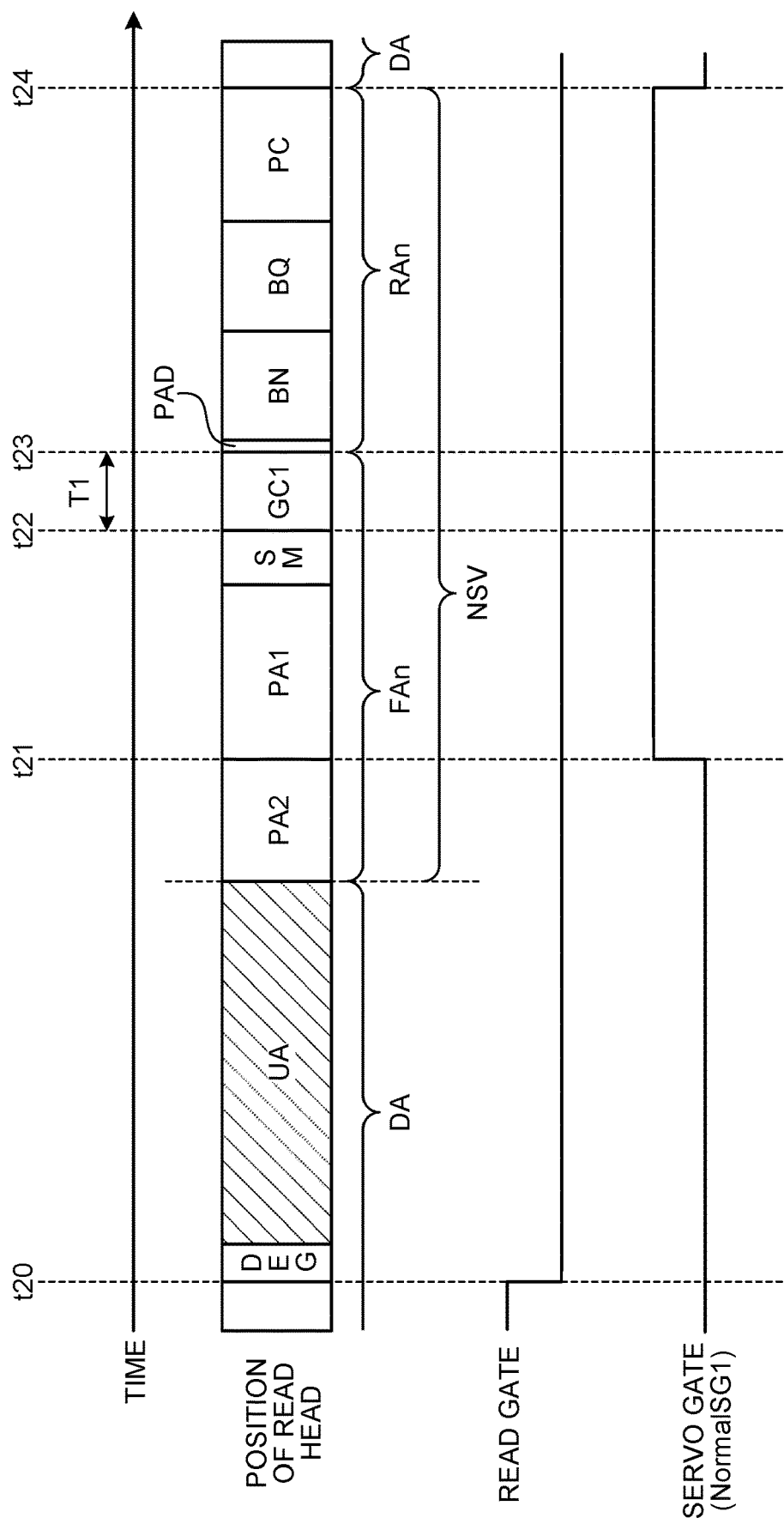
FIG. 11 is a schematic diagram for describing an example of a waveform of a servo gate of a pattern NormalSG1 used when the magnetic head passes through a normal servo sector in the read operation of the first embodiment.

FIG. 11 is a schematic diagram for describing an example of a waveform of a servo gate of the NormalSG1 pattern used when the magnetic head 22 passes through a normal servo sector NSV in the read operation of the first embodiment. In FIG. 11, the relationship between the position of the read head 22r, the state of the read gate, and the state of the servo gate is drawn.

When the read head 22r reaches immediately before the degaussing area DEG (time t20), the HDC 23 prohibits reading of data by deasserting the read gate.

When the read head 22r reaches the start position of the preamble area PA1 (time t21), the HDC 23 asserts the servo gate.

When detecting the servo mark in the period in which the servo gate is asserted (time t22), the RWC 25 interprets a signal read by the read head 22r and supplied from the head IC 24 in a period T1 from time t22 to time t23 as a Gray code and demodulates the signal, similarly to the operation described using FIG. 9.

When the read head 22r reaches the end position of the post code area PC (time t24), the HDC 23 deasserts the servo gate.

Therefore, when the magnetic head 22 passes through the normal servo sector NSV in the read operation, the controller 30 acquires the Gray code from the Gray code area GC1 as in the case of the ride operation.

Figure 12:
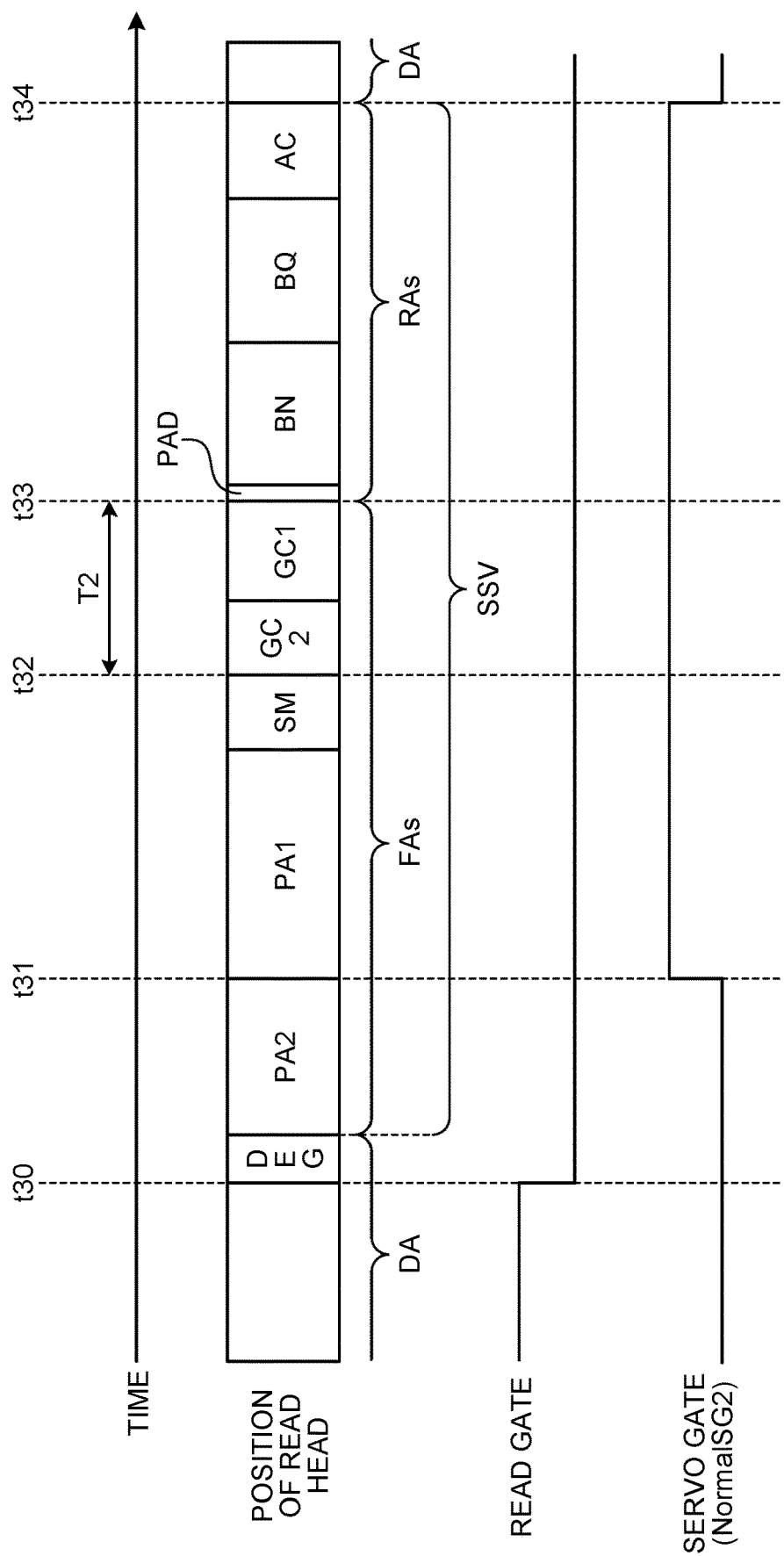
FIG. 12 is a schematic diagram for describing an example of a waveform of a servo gate of a pattern NormalSG2 used when the magnetic head passes through a short servo sector in the read operation of the first embodiment.

FIG. 12 is a schematic diagram for describing an example of a waveform of a servo gate of the pattern NormalSG2 used when the magnetic head 22 passes through a short servo sector SSV in the read operation of the first embodiment.

When the read head 22r reaches immediately before the degaussing area DEG (time t30), the HDC 23 prohibits reading of data by deasserting the read gate.

When the read head 22r reaches the start position of the preamble area PA1 (time t31), the HDC 23 asserts the servo gate.

When detecting the servo mark in the period in which the servo gate is asserted (time t32), the RWC 25 interprets a signal read by the read head 22r and supplied from the head IC 24 in a period T2 from time t32 to time t33 as a Gray code and demodulates the signal. The period T2 is a known period of time required for the magnetic head 22 to pass through the Gray code areas GC2 and GC1 and is longer than the period T1. The period T2 is stored in advance in a desired storage device inside the RWC 25 or outside the RWC 25 in association with the short servo sector SSV. When the processor 26 notifies that the type of the servo sector SV to pass through is the short servo sector SSV, the RWC 25 specifies the period T2, which is a period associated with the short servo sector SSV, and demodulates and acquires a signal acquired from the time t32 until the period T2 elapses as the Gray code.

After the time t33, when the read head 22r reaches the end position of the rear area RAs, that is, the end position of the additional code area AC (time t34), the HDC 23 deasserts the servo gate.

Figure 13:
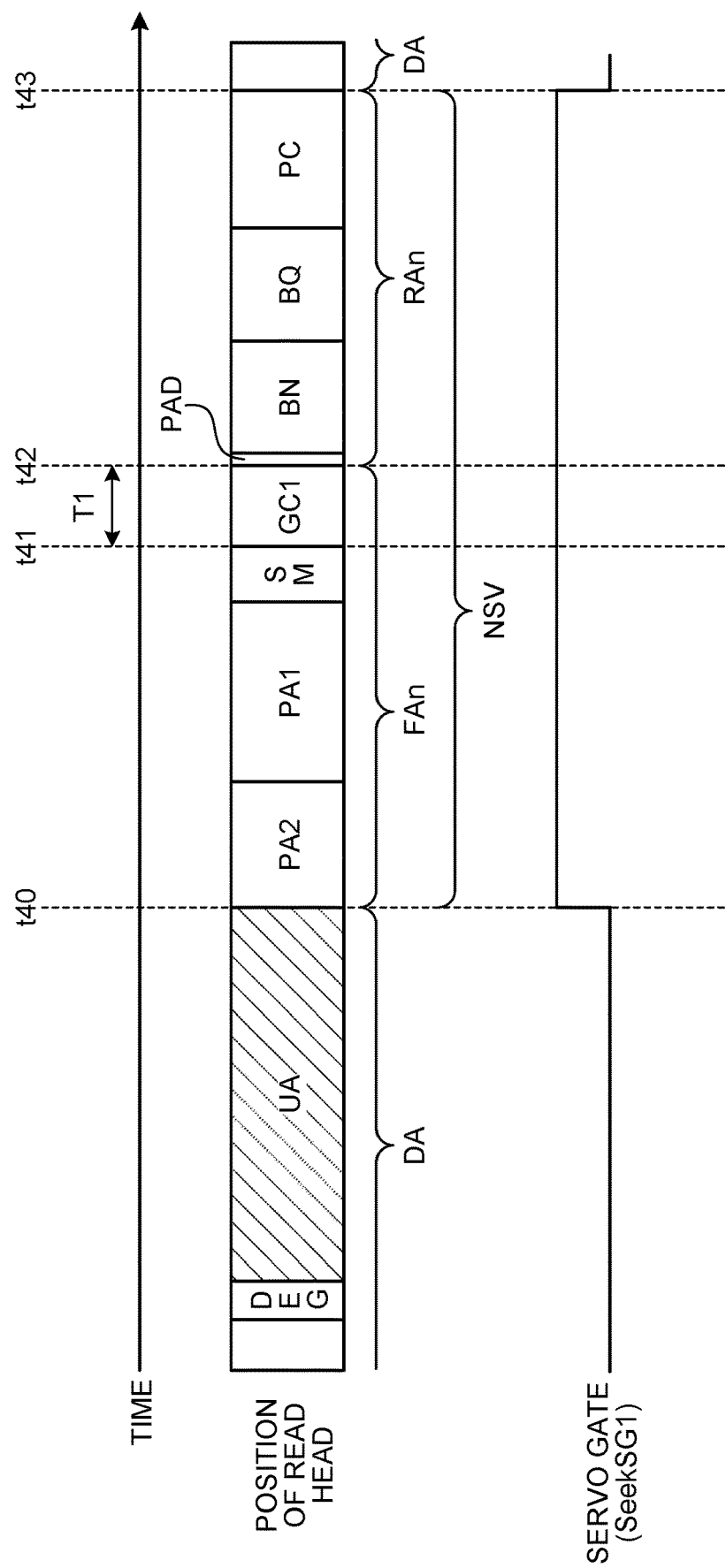
FIG. 13 is a schematic diagram for explaining an example of the waveform of a servo gate of a pattern SeekSG1 used when the magnetic head passes through a normal servo sector in the seek operation of the first embodiment.

FIG. 13 is a schematic diagram for explaining an example of the waveform of a servo gate of the pattern SeekSG1 used when the magnetic head 22 passes through a normal servo sector NSV in the seek operation of the first embodiment. In FIG. 13, the relationship between the position of the read head 22r and the state of the servo gate is drawn.

When the read head 22r reaches the start position of the preamble area PA2 (time t40), the HDC 23 asserts the servo gate.

When detecting the servo mark in the period in which the servo gate is asserted (time t41), the RWC 25 interprets a signal read by the read head 22r and supplied from the head IC 24 in a period T1 from time t41 to time t42 as a Gray code and demodulates the signal, similarly to the operation described using FIG. 9.

After the time t42, when the read head 22r reaches the end position of the post code area PC (time t43), the HDC 23 deasserts the servo gate.

Figure 14:
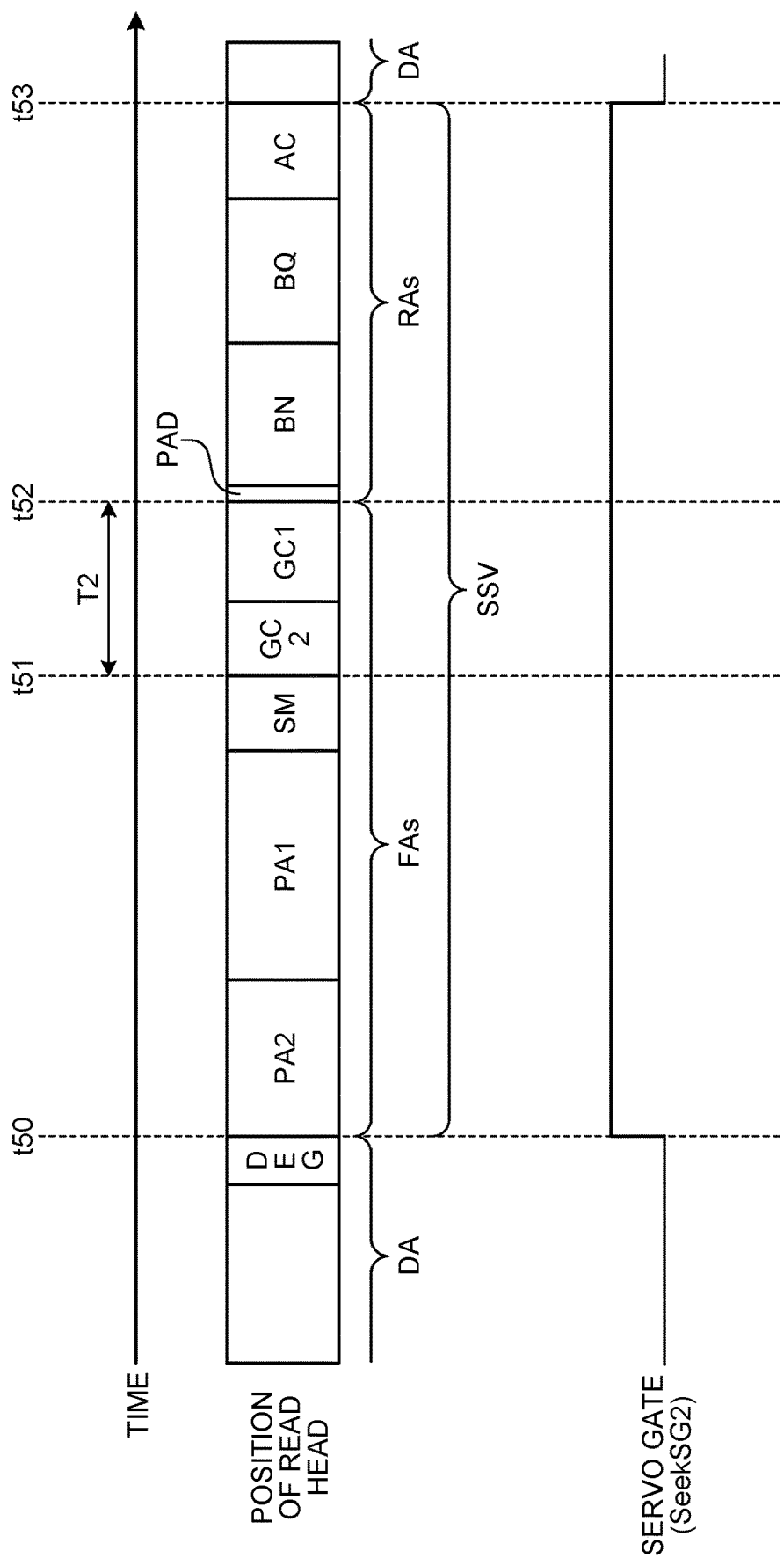
FIG. 14 is a schematic diagram for explaining an example of the waveform of a servo gate of a pattern SeekSG2 used when the magnetic head passes through a short servo sector in the seek operation of the first embodiment.

FIG. 14 is a schematic diagram for explaining an example of the waveform of a servo gate of the pattern SeekSG2 used when the magnetic head 22 passes through a short servo sector SSV in the seek operation of the first embodiment.

When the read head 22r reaches the start position of the preamble area PA2 (time t50), the HDC 23 asserts the servo gate.

When detecting the servo mark in the period in which the servo gate is asserted (time t51), the RWC 25 interprets a signal read by the read head 22r and supplied from the head IC 24 in a period T2 from time t51 to time t52 as a Gray code and demodulates the signal, similarly to the operation described using FIG. 12.

After the time t52, when the read head 22r reaches the end position of the additional code area AC (time t53), the HDC 23 deasserts the servo gate.

Figure 15:
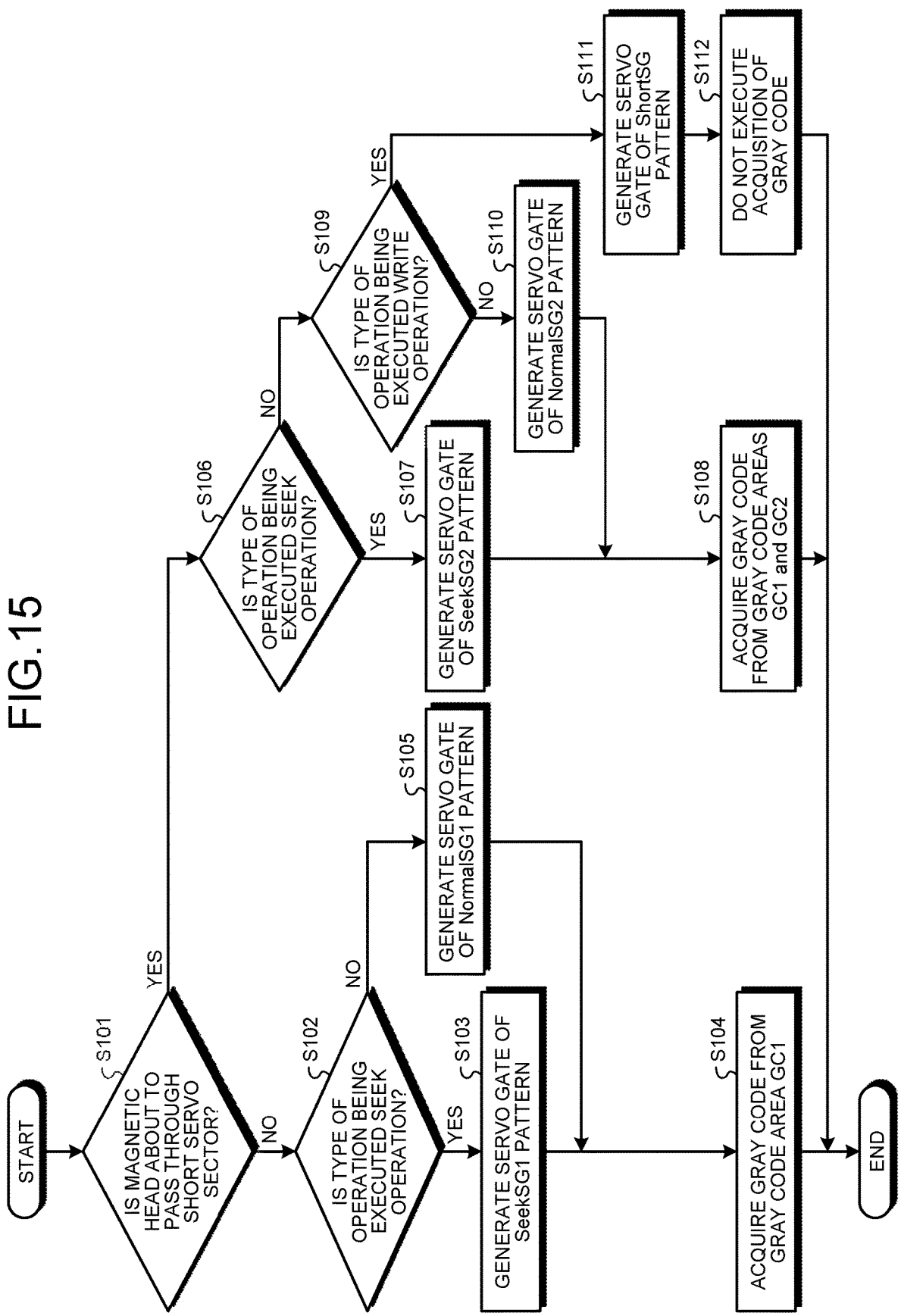
FIG. 15 is a flowchart illustrating an example of the operation of determining a demodulation method of servo information of each servo sector by a controller according to the first embodiment.

FIG. 15 is a flowchart illustrating an example of the operation of determining a demodulation method of the servo information of each of the servo sectors SV by the controller 30 according to the first embodiment. Note that a series of operations illustrated in FIG. 15 is executed every time the magnetic head 22 passes through each of the servo sectors SV.

First, the controller 30 (for example, the processor 26) determines whether or not the magnetic head 22 is about to pass through a short servo sector SSV (S101). If the magnetic head 22 is about to pass through a normal servo sector NSV instead of a short servo sector SSV (S101: No), the controller 30 (for example, the processor 26) determines whether or not the type of the operation being executed is the seek operation (S102).

If the type of the operation being executed is the seek operation (S102: Yes), the controller 30 (for example, the HDC 23) generates a servo gate of the pattern SeekSG1 (S103). As a result, the RWC 25 acquires the Gray code from the Gray code area GC1 (S104). Then, the operation ends.

If the type of the operation being executed is not the seek operation but the tracking operation, that is, the operation of maintaining the position of the magnetic head 22 on a target track 41 for the write operation or the read operation (S102: No), the controller 30 (for example, the HDC 23) generates a servo gate of the pattern of NormalSG1 (S105). As a result, the RWC 25 acquires the Gray code from the Gray code area GC1 (S104). Then, the operation ends.

If the magnetic head 22 is about to pass through a short servo sector SSV (S101: Yes), the controller 30 (for example, the processor 26) determines whether or not the type of the operation being executed is the seek operation (S106).

If the type of the operation being executed is the seek operation (S106: Yes), the controller 30 (for example, the HDC 23) generates a servo gate of the pattern SeekSG2 (S107). As a result, the RWC 25 acquires Gray codes from the Gray code areas GC1 and GC2 (S108). Then, the operation ends.

If the type of the operation being executed is not the seek operation but the tracking operation (S106: No), the controller 30 (for example, the processor 26) determines whether or not the type of the operation being executed is the write operation (S109).

If the type of the operation being executed is not the write operation but the read operation (S109: No), the controller 30 (for example, the HDC 23) generates a servo gate of the pattern NormalSG2 (S110). As a result, the RWC 25 acquires Gray codes from the Gray code areas GC1 and GC2 (S108). Then, the operation ends.

If the type of the operation being executed is the write operation (S109: Yes), the controller 30 (for example, the HDC 23) generates a servo gate of the ShortSG pattern (S111). As a result, the RWC 25 acquires no Gray codes (S112), and the operation ends.

As described above, according to the first embodiment, each of the servo sectors SV includes a front area FA in which the first information, including the preambles, the servo mark, and the Gray code, is written and a rear area RA in which the second information including the burst patterns is written, the rear area RA disposed after the front area FA. The circumferential length of the front area of each of the short servo sectors SSV is longer than the circumferential length of the front area of a normal servo sector NSV by the amount of the Gray code area GC2 added to the front area of each of the short servo sectors SSV.

In the read operation, the controller 30 can acquire a Gray code having a larger amount of information than that of the comparative example from a short servo sector SSV, and thus the read performance is improved. That is, the performance is improved.

In addition, in the seek operation, the controller 30 can acquire a Gray code having a larger amount of information than that of the comparative example from a short servo sector SSV, and thus the occurrence frequency of seek errors is reduced. That is, the performance is improved.

Furthermore, according to the first embodiment, the length of the front area FAs included in a short servo sector SSV is set on the basis of the read-write gap length RWgap.

For example, the length $L_{GC2}$ of the Gray code area GC2 may be determined in such a manner that the distance (P13–P10) and the distance (P12–P10) are equal at the radial position where the read-write gap length RWgap has the minimum value, and the length of the front area FAs may be determined on the basis of the length $L_{GC2}$ of the Gray code area GC2 and Equation (2). The length $L_{GC2}$ of the Gray code area GC2 determined in this manner may be shared in the magnetic disk 11.

Alternatively, the length $L_{GC2}$ of the Gray code area GC2 may be determined in such a manner that the distance (P13–P10) is slightly larger than the distance (P12–P10) are equal at the radial position where the read-write gap length RWgap has the minimum value, and the length of the front area FAs may be determined on the basis of the length $L_{GC2}$ of the Gray code area GC2 and Equation (2). The length $L_{GC2}$ of the Gray code area GC2 determined in this manner may be shared in the magnetic disk 11.

Alternatively, the length $L_{GC2}$ of the Gray code area GC2 in each of the tracks 41 may be determined in such a manner that the distance (P13–P10) and the distance (P12–P10) are equal at any radial position, and the length of the front area FAs in each of the tracks 41 may be determined on the basis of the length $L_{GC2}$ of the Gray code area GC2 and Equation (2).

Furthermore, according to the first embodiment, a Gray code written in the front area FAs of a short servo sector SSV includes a full cylinder address, and a Gray code written in the front area FSn of a normal servo sector NSV includes a part of a cylinder address.

Therefore, the controller 30 can acquire the full cylinder address when the magnetic head 22 passes through the short servo sector SSV in the read operation. In addition, the controller 30 can acquire the full cylinder address when the magnetic head 22 passes through the short servo sector SSV in the seek operation.

Note that, in the first embodiment, the amount of information of the Gray code written in the front area FAs of a short servo sector SSV is larger than that in the comparative example. The type of servo information whose amount of information is larger than that of the comparative example is not limited to the Gray code.

For example, the preambles may be written in a longer area in the front area FAs of a short servo sector SSV, the area longer than that in the comparative example, and the length of the front area FAs of the short servo sector SSV may be increased accordingly. By making the area, from which the preambles are obtained, longer, the accuracy of servo waveform sampling data to be captured in the RWC 25 is improved. As a result, the positioning accuracy is improved. That is, the performance is improved.

Alternatively, the servo mark may be written in a longer area in the front area FAs of the short servo sector SSV, the area longer than that in the comparative example, and the length of the front area FAs of the short servo sector SSV may be increased accordingly. By making the area where the servo mark is obtained longer, the frequency of occurrence of detection errors of the servo mark is reduced. As a result, the positioning accuracy is improved. That is, the performance is improved.

As described above, the type of servo information whose amount of information is increased as compared to that of the comparative example may be any of the preambles, the servo mark, or the Gray code. Alternatively, an area, in which desirable information different from any of the preambles, the servo mark, and the Gray code is written, may be added to the front area FAs of a short servo sector SSV, and the length of the front area FAs of the short servo sector SSV may be thereby increased.

Second Embodiment

In a second embodiment, a magnetic disk device can read servo information by a read head in parallel with writing of data while writing the data by using a write head. The function of reading servo information in parallel with writing of data is referred to as a servo-read-during-write function. According to the servo-read-during-write function, the noise caused in a signal from the read head by the writing of the data by the write head is removed, thereby allowing writing of the data and reading of the servo information to be performed simultaneously.

In the magnetic disk device having the servo-read-during-write function, the length of an unwritable area UA generated due to a read-write gap length RWgap is suppressed. Therefore, in the second embodiment, basically, all servo sectors SV are normal servo sectors NSV. Note that, a magnetic disk may include a short servo sector SSV also in the second embodiment.

Hereinafter, the magnetic disk device of the second embodiment is denoted as a magnetic disk device 1a, the magnetic disk of the second embodiment is denoted as a magnetic disk 11a, and a controller of the second embodiment is denoted as a controller 30a. Then, matters different from those of the first embodiment will be described, and description of the same matters as those of the first embodiment will be omitted or briefly described.

Figure 16:
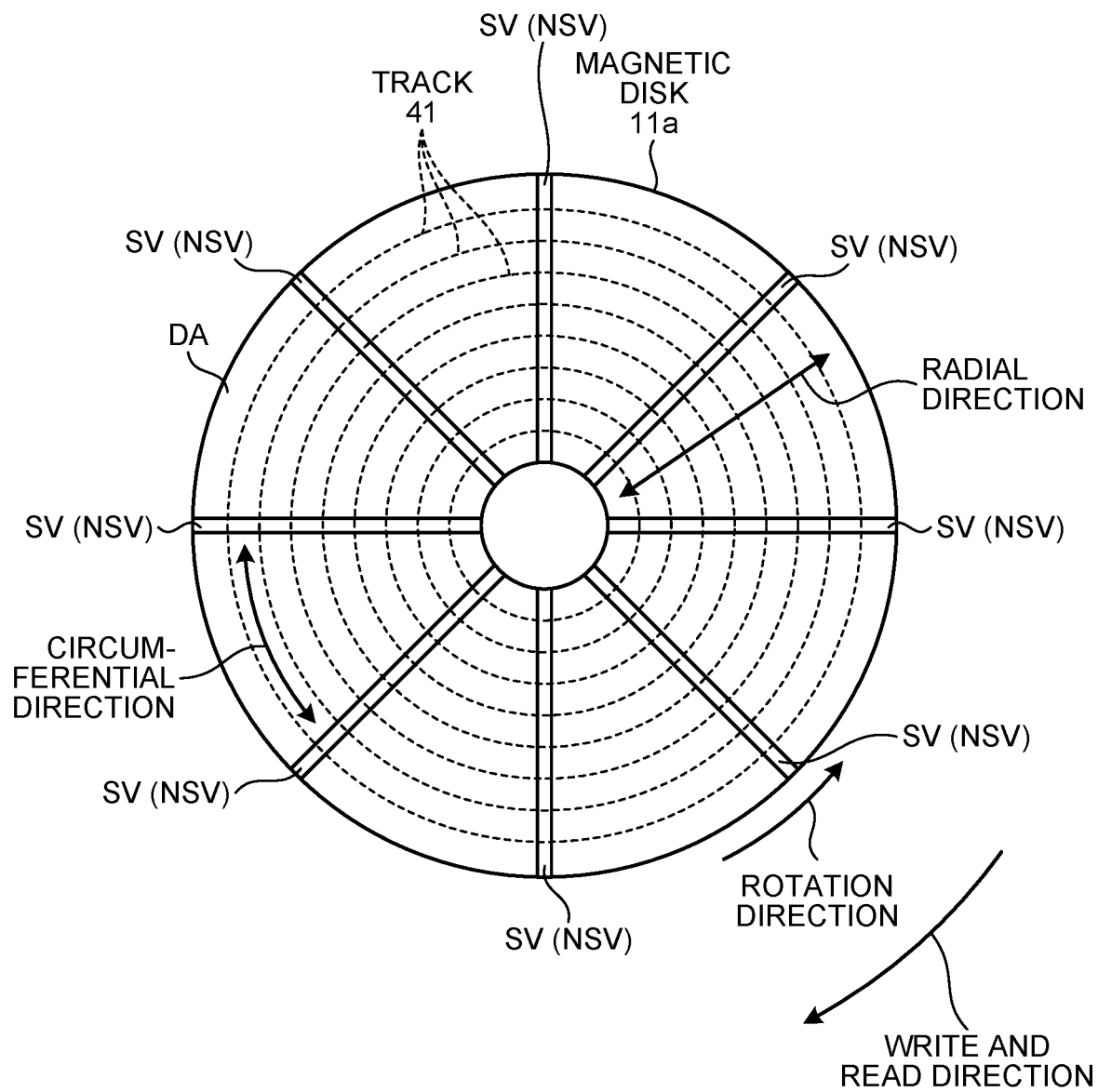
FIG. 16 is a schematic diagram illustrating an example of a configuration of a magnetic disk according to a second embodiment.

FIG. 16 is a schematic diagram illustrating an example of a configuration of the magnetic disk 11a according to the second embodiment. As illustrated in the drawing, the magnetic disk 11a is different from the magnetic disk 11 of the first embodiment in that all the servo sectors SV are normal servo sectors NSV.

Figure 17:
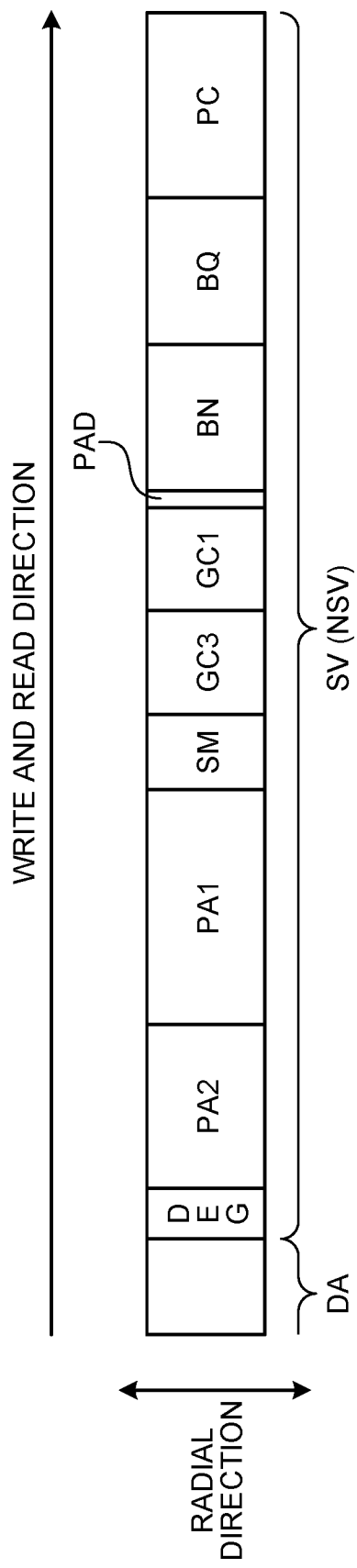
FIG. 17 is a diagram illustrating an example of a configuration of a normal servo sector according to the second embodiment.

FIG. 17 is a diagram illustrating an example of the configuration of a normal servo sector NSV according to the second embodiment. In this example, in the normal servo sector NSV, a preamble area PA2 in which a preamble #2 is written, a preamble area PA1 in which a preamble #1 is written, a servo mark area SM in which a servo mark is written, a Gray code area GC3 and a Gray code area GC1 in which a Gray code is written, an area PAD in which a PAD is written, a burst area BN in which an N burst is written, a burst area BQ in which a Q burst is written, and a post code area PC in which a post code is written are arranged in the order mentioned in the write and read direction.

As described above, in the magnetic disk device 1a having the servo-read-during-write function, the length of the unwritable area UA generated immediately before the servo sector SV due to the read-write gap length RWgap is suppressed. However, there are cases where the unwritable area UA cannot be completely eliminated immediately before the servo sector SV.

In the second embodiment, the length of the area in which the Gray code is written is increased from the length of the Gray code area GC1 to the length of the Gray code areas GC1 and GC3. As the length of the area in which the Gray code is written is increased, the length of the unwritable area UA is further suppressed.

Note that, in the example illustrated in FIG. 17, there is no unwritable area UA immediately before the normal servo sector NSV. It is acceptable that an unwritable area UA of a slight length remains immediately before the normal servo sector NSV.

Figure 18:
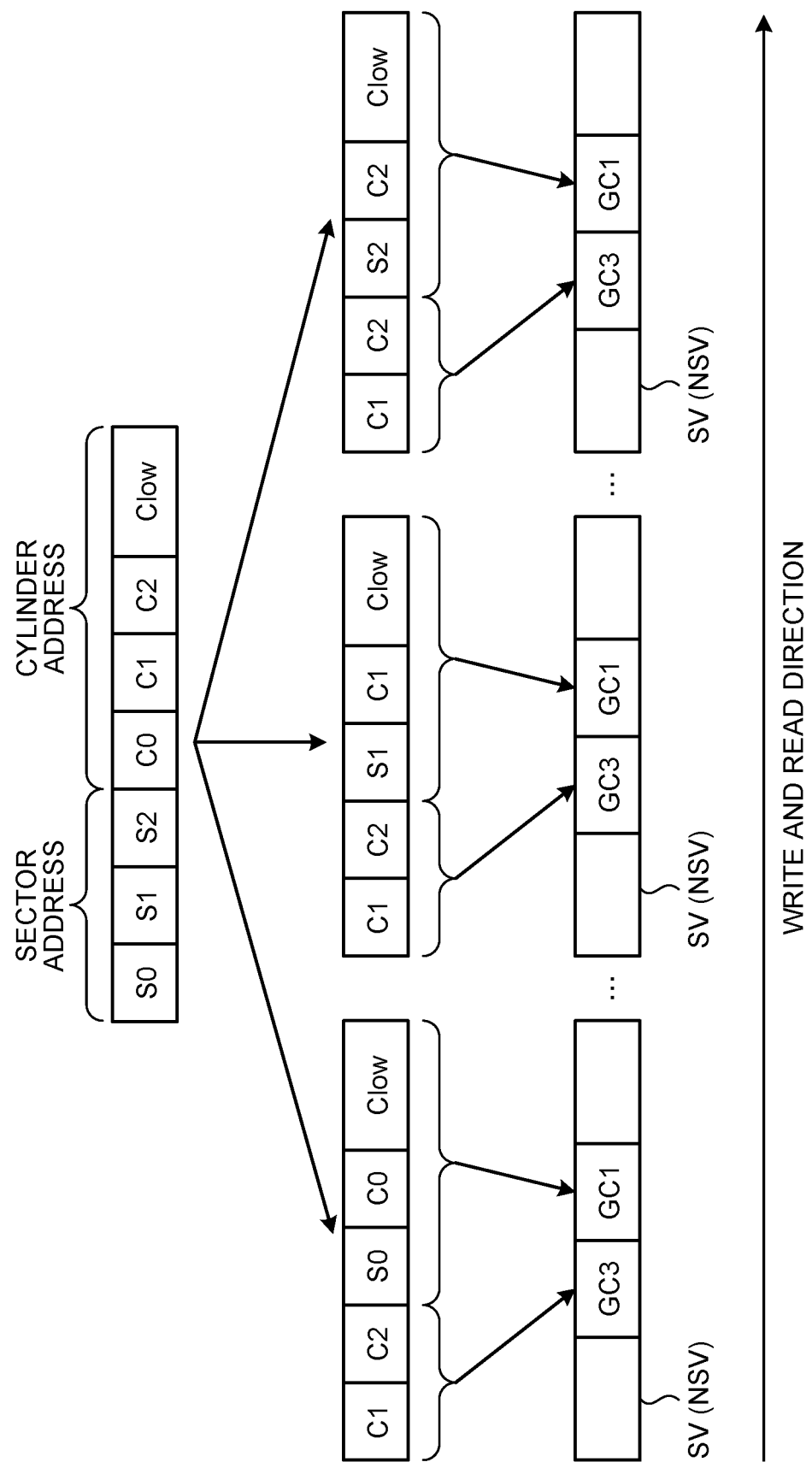
FIG. 18 is a schematic diagram for describing a Gray code written in Gray code areas according to the second embodiment.

FIG. 18 is a schematic diagram for describing the Gray code written in the Gray code areas GC1 and GC3 according to the second embodiment.

In the example illustrated in FIG. 18, a Gray code having a structure similar to that of a normal servo sector NSV of the first embodiment is written in the Gray code area GC1.

Therefore, in a case of focusing only on the Gray code area GC1, the full Gray code is distributed to three normal servo sectors NSV. The controller 30 needs to demodulate the Gray code from the three consecutively-arranged normal servo sectors NSV in order to obtain the full sector address and the full cylinder address.

In the Gray code area GC3, lower two bits of the full cylinder address, that is, a bit C1 and a bit C2 are written.

Therefore, it is possible to obtain the full cylinder address from one of the three consecutively-arranged normal servo sectors NSV. In addition, it is possible to obtain a portion of the full cylinder address excluding the most upper bit from each of the other two of the three normal servo sectors NSV.

That is, in the second embodiment, since the Gray code area GC3 is included in the normal servo sector NSV in addition to the Gray code area GC1, the amount of information of the Gray code obtained from the normal servo sectors NSV is increased.

In the controller 30a, when the magnetic head 22 passes through a certain servo sector SV (that is, a normal servo sector NSV), the processor 26 notifies an HDC 23 and an RWC 25 of the type of the operation being executed. The HDC 23 generates one of two patterns of servo gates on the basis of the notified type of the operation being executed. The RWC 25 controls a write gate, a read gate, and the servo gate on the basis of the servo gate and the notified type of the operation being executed.

FIG. 19 is a schematic table for describing a relationship between the type of an operation being executed and a pattern of a servo gate to be used according to the second embodiment;

When the magnetic head 22 passes through a normal servo sector NSV in the write operation and the read operation, a servo gate having a waveform of a pattern NormalSG3 is used. When the magnetic head 22 passes through a normal servo sector NSV in the seek operation, a servo gate having a pattern SeekSG3 is used.

Figure 20:
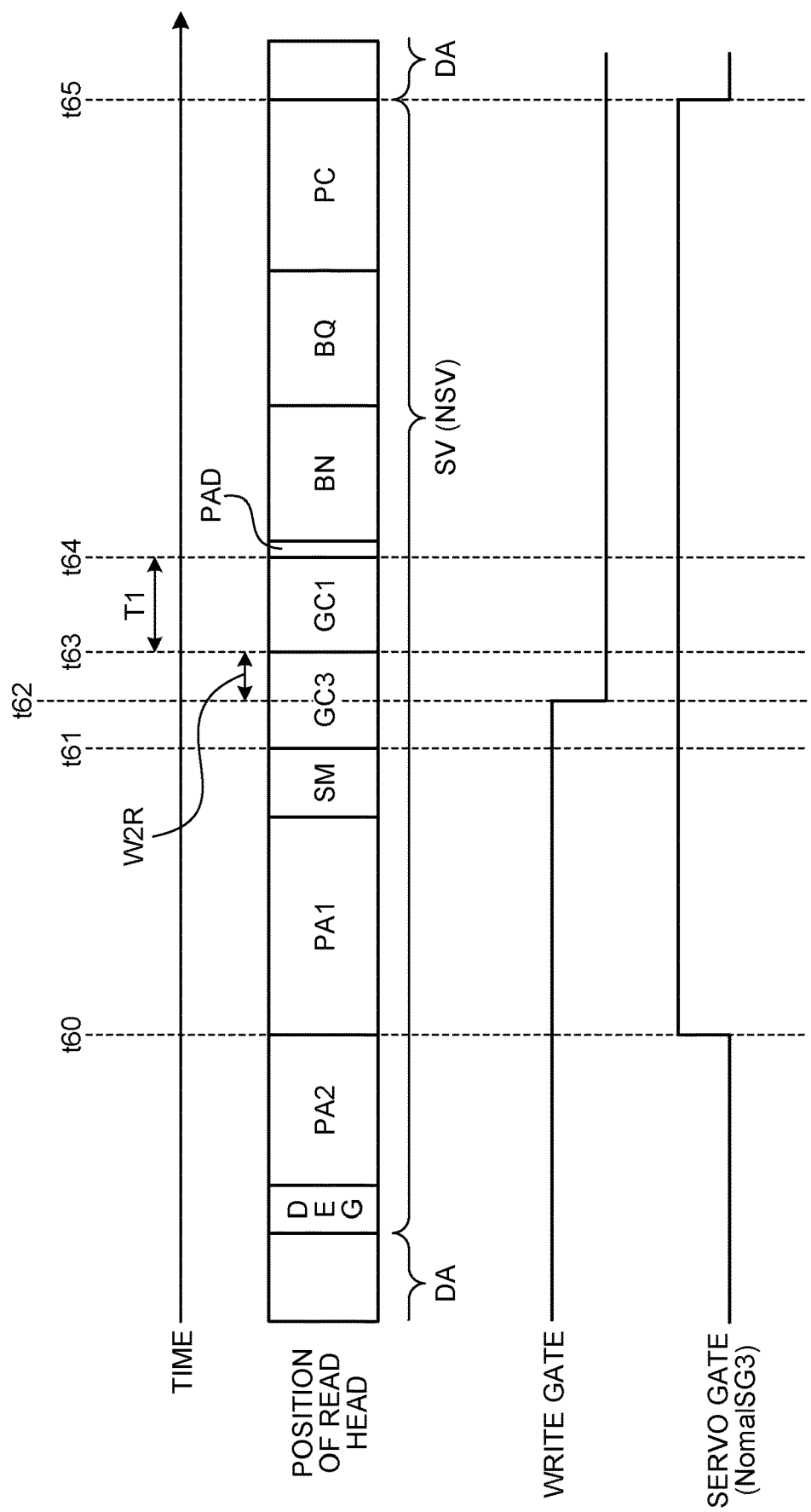
FIG. 20 is a schematic diagram for describing an example of a waveform of a servo gate of a NormalSG3 pattern used when a magnetic head passes through a normal servo sector in the write operation of the second embodiment.

FIG. 20 is a schematic diagram for describing an example of a waveform of a servo gate of the NormalSG3 pattern used when the magnetic head 22 passes through a normal servo sector NSV in the write operation of the second embodiment. In FIG. 20, the temporal transition of the position of the read head 22r in the circumferential direction is drawn. The relationship among the position of the read head 22r, the state of the write gate, and the state of the servo gate is further drawn.

When the read head 22r reaches the start position of the preamble area PA1 (time t60), the HDC 23 asserts the servo gate. As a result, the RWC 25 starts demodulation of the servo information.

Note that, at time t60, the write gate is maintained in an asserted state. Therefore, the RWC 25 starts demodulation of the servo information using the read head 22r while continuing writing of data using the write head 22w.

When detecting the servo mark in the period in which the servo gate is asserted (time t61), the RWC 25 specifies the timing at which the read head 22r reaches the start position of the Gray code area GC1 (time t63) on the basis of elapsed time from the time t61. Then, the RWC 25 interprets a signal read by the read head 22r and supplied from a head IC 24 in a period T1 from the time t63 to time t64 as a Gray code and demodulates the signal. The period T1 is a known period of time required for the magnetic head 22 to pass through the Gray code area GC1. The period T1 is stored in advance in a desired storage device inside the RWC 25 or outside the RWC 25 in association with the write operation. In a case where it is notified that the type of the operation being executed is the write operation, the RWC 25 specifies the period T1 which is a period associated with the write operation and the time t63 and regards the period T1 from the time t63 as a period for acquiring the Gray code.

When the read head 22r reaches a position separated from the start position of the Gray code area GC1 in the opposite direction of the write and read direction by the write-read transition length W2R (time t62), the HDC 23 prohibits writing of data by deasserting the write gate.

As described above, according to the servo-read-during-write function, the noise caused in a signal from the read head 22r by the writing of the data by the write head 22w is removed, thereby allowing writing of the data and reading of the servo information to be performed simultaneously.

Since the preamble #1, the preamble #2, and the servo mark have a structure that does not depend on the position in the radial direction, it is relatively easy to remove noise from the read preamble #1, preamble #2, and servo mark. However, the Gray code written in the Gray code area GC1 includes the cylinder address as described using FIG. 18. That is, the Gray code written in the Gray code area GC1 has a structure that depends on the position in the radial direction. Therefore, it is relatively difficult to remove noise from the Gray code read from the Gray code area GC1.

The use of the write head 22w is halted until the read head 22r reaches the Gray code area GC1 so that the Gray code can be acquired from the Gray code area GC1 without errors as much as possible. Therefore, the write gate is deasserted at a position where the read head 22r goes back by the write-read transition length W2R from the start position of the Gray code area GC1.

After the time t64, when the read head 22r reaches the end position of the post code area PC (time t65), the HDC 23 deasserts the servo gate.

Figure 21:
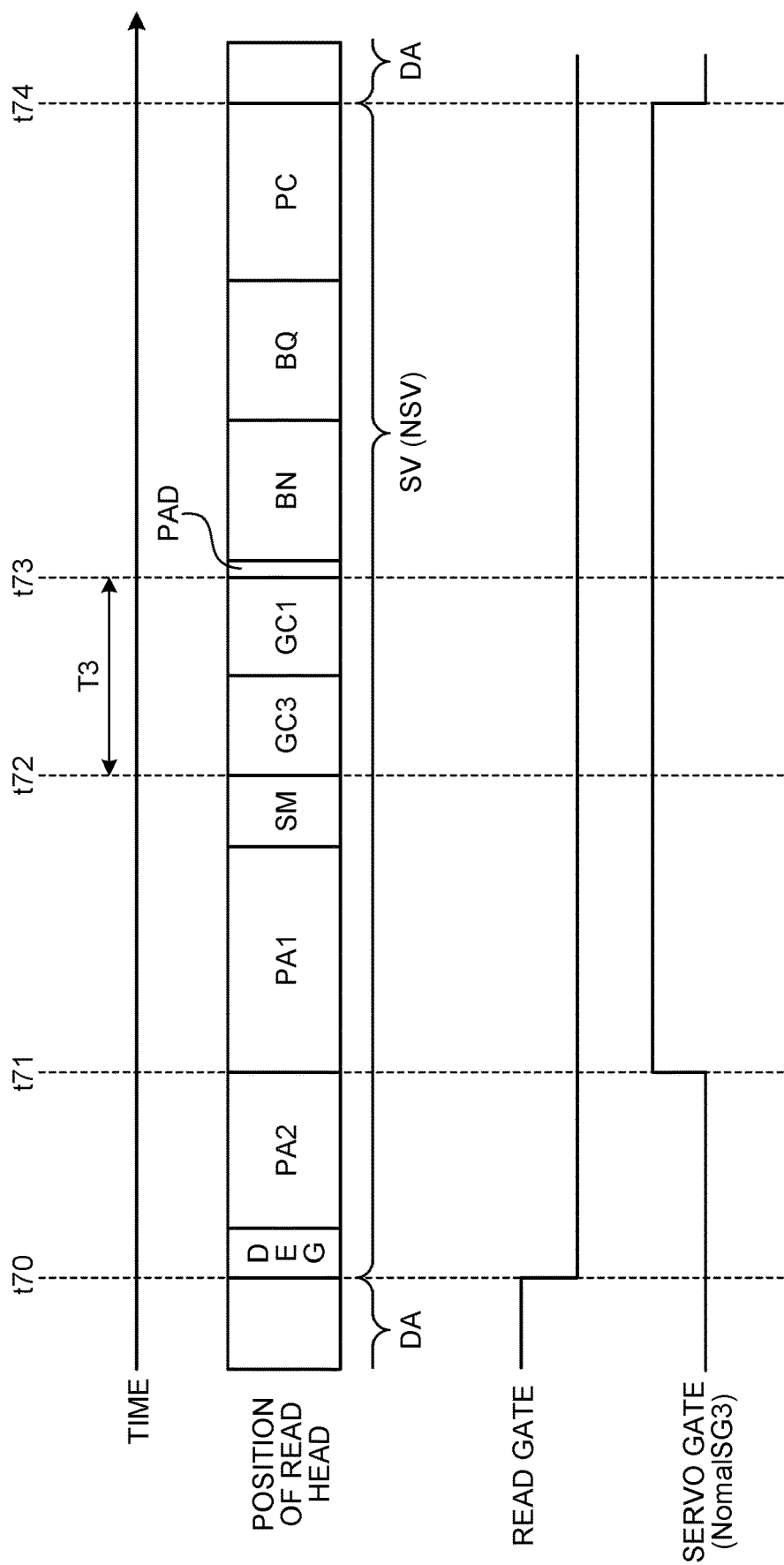
FIG. 21 is a schematic diagram for describing an example of a waveform of a servo gate of a pattern NormalSG3 used when the magnetic head passes through a normal servo sector in the read operation of the second embodiment.

FIG. 21 is a schematic diagram for describing an example of a waveform of a servo gate of the NormalSG3 pattern used when the magnetic head 22 passes through a normal servo sector NSV in the read operation of the second embodiment. In FIG. 21, the relationship between the position of the read head 22r, the state of the read gate, and the state of the servo gate is drawn.

When the read head 22r reaches immediately before the degaussing area DEG (time t70), the HDC 23 prohibits reading of data by deasserting the read gate.

When the read head 22r reaches the start position of the preamble area PA1 (time t71), the HDC 23 asserts the servo gate.

When detecting the servo mark in the period in which the servo gate is asserted (time t72), the RWC 25 interprets a signal read by the read head 22r and supplied from the head IC 24 in a period T3 from the time t72 to time t73 as a Gray code and demodulates the signal. The period T3 is a known period of time required for the magnetic head 22 to pass through the Gray code areas GC1 and GC3. The period T3 is longer than the period T1. The period T3 is stored in advance in a desired storage device inside the RWC 25 or outside the RWC 25 in association with both the read operation and the seek operation. In a case where it is notified that the type of the operation being executed is the read operation, the RWC 25 specifies the period T3 which is a period associated with the read operation and regards the period T3 from the time t73 as a period for acquiring the Gray code.

After the time t73, when the read head 22r reaches the end position of the post code area PC (time t74), the HDC 23 deasserts the servo gate.

Therefore, when the magnetic head 22 passes through the normal servo sector NSV in the read operation, the controller 30a acquires the Gray code from the Gray code areas GC1 and GC3.

Figure 22:
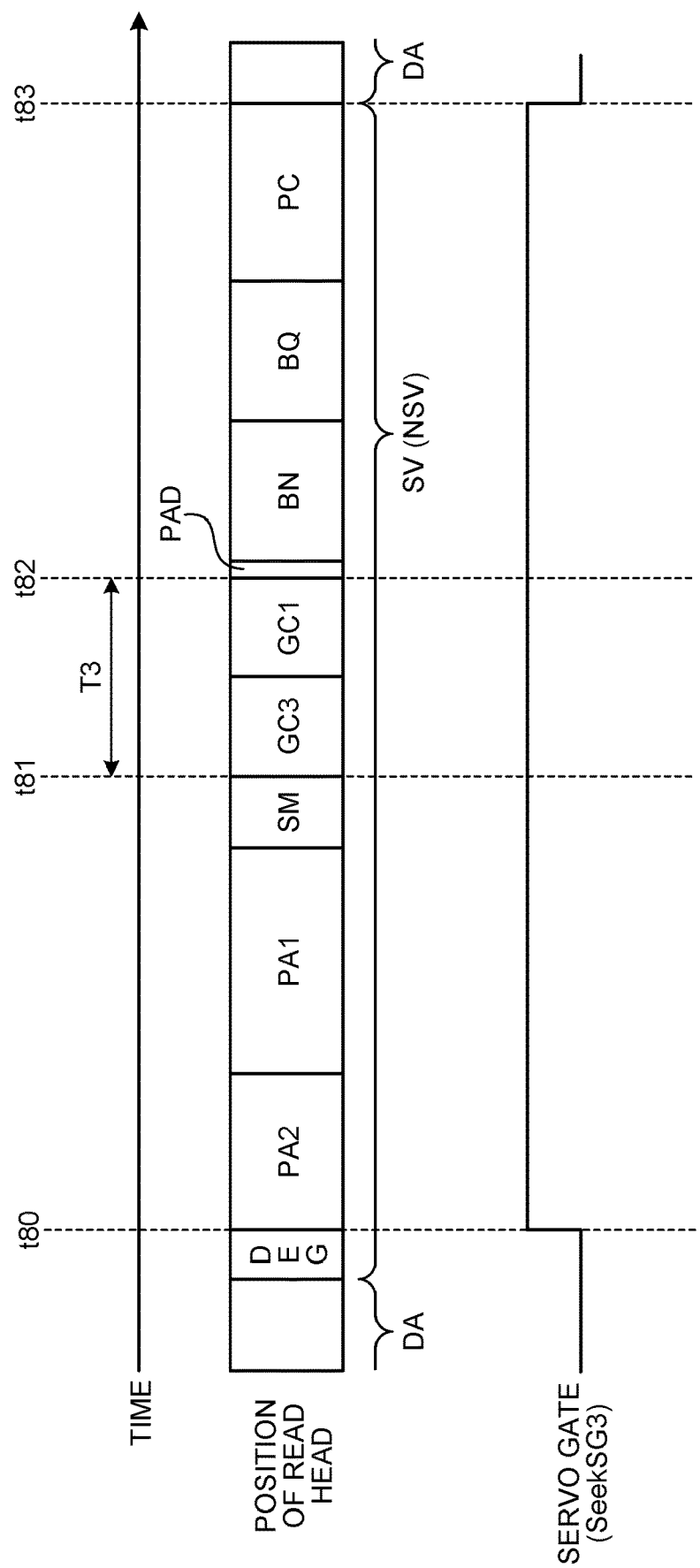
FIG. 22 is a schematic diagram for explaining an example of the waveform of a servo gate of a pattern SeekSG3 used when the magnetic head passes through a normal servo sector in the seek operation of the second embodiment.

FIG. 22 is a schematic diagram for explaining an example of the waveform of a servo gate of the pattern SeekSG3 used when the magnetic head 22 passes through a normal servo sector NSV in the seek operation of the second embodiment.

In FIG. 22, the relationship between the position of the read head 22r and the state of the servo gate is drawn.

When the read head 22r reaches the start position of the preamble area PA2 (time t80), the HDC 23 asserts the servo gate.

When detecting the servo mark in the period in which the servo gate is asserted (time t81), the RWC 25 interprets a signal read by the read head 22r and supplied from the head IC 24 in a period T3 from the time t81 to time t82 as a Gray code and demodulates the signal. That is, in a case where it is notified that the type of the operation being executed is the seek operation, the RWC 25 specifies the period T3 which is a period associated with the seek operation and regards the period T3 from the time t81 as a period for acquiring the Gray code.

After the time t82, when the read head 22r reaches the end position of the post code area PC (time t83), the HDC 23 deasserts the servo gate.

Therefore, when the magnetic head 22 passes through the normal servo sector NSV in the seek operation, the controller 30a acquires the Gray code from the Gray code areas GC1 and GC3.

Figure 23:
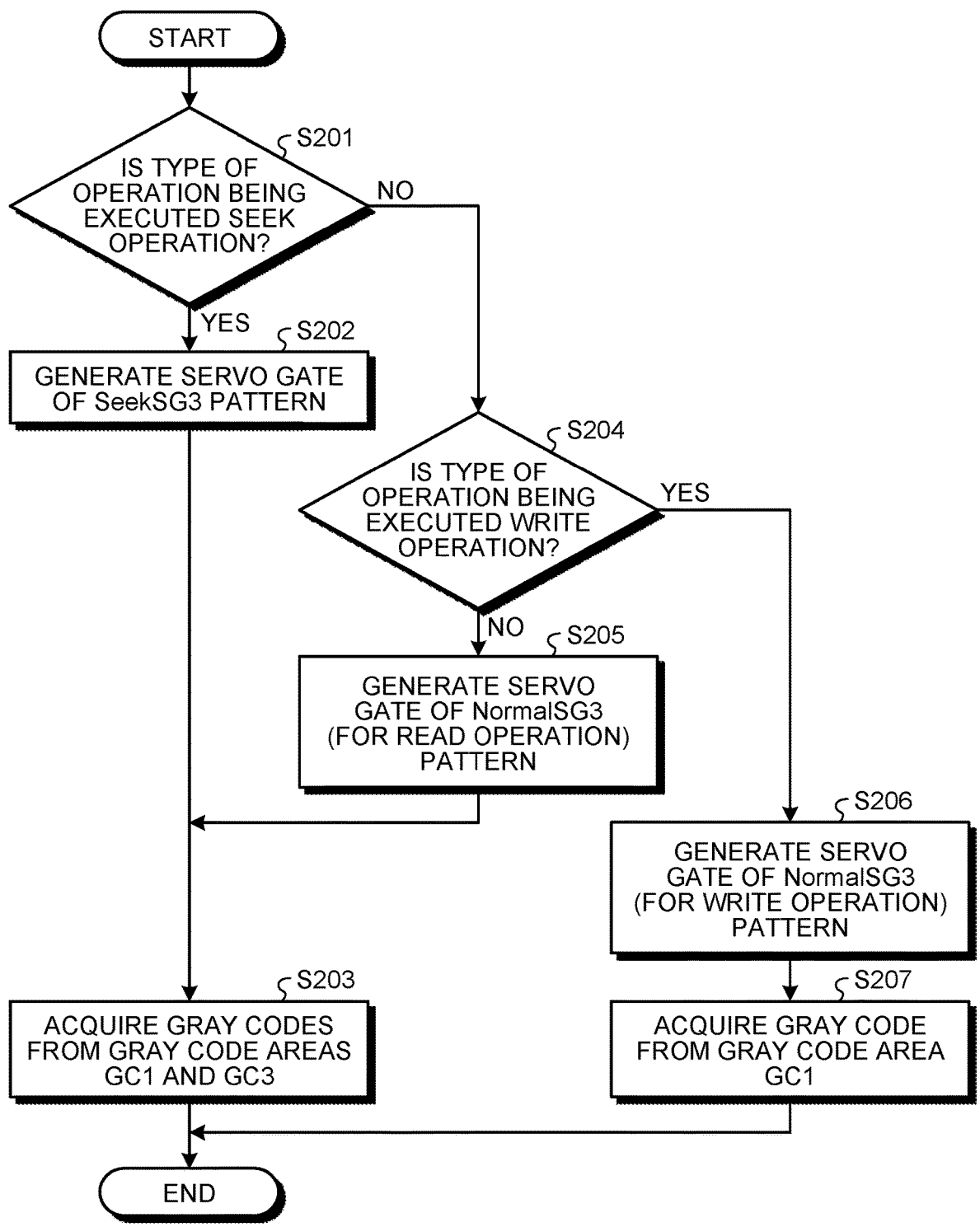
FIG. 23 is a flowchart illustrating an example of the operation of determining a demodulation method of servo information of each servo sector by a controller according to the second embodiment.

FIG. 23 is a flowchart illustrating an example of the operation of determining a demodulation method of the servo information of each of the servo sectors SV by the controller 30a according to the second embodiment. Note that a series of operations illustrated in FIG. 23 is executed every time the magnetic head 22 passes through each of the servo sectors SV.

First, the controller 30a (for example, a processor 26) determines whether the type of the operation being executed is the seek operation (S201).

If the type of the operation being executed is the seek operation (S201: Yes), the controller 30a (for example, the HDC 23) generates a servo gate of the pattern SeekSG3 (S202). As a result, the RWC 25 acquires Gray codes from the Gray code areas GC1 and GC3 (S203). Then, the operation ends.

If the type of the operation being executed is not the seek operation (S201: No), the controller 30a (for example, the processor 26) determines whether or not the type of the operation being executed is the write operation (S204).

If the type of the operation being executed is not the write operation but the read operation (S204: No), the controller 30a (for example, the HDC 23) generates a servo gate of the pattern NormalSG3 for the read operation (S205). As a result, the RWC 25 acquires Gray codes from the Gray code areas GC1 and GC3 (S203). Then, the operation ends.

If the type of the operation being executed is the write operation (S204: Yes), the controller 30a (for example, the HDC 23) generates a servo gate of the pattern NormalSG3 (S206). As a result, the RWC 25 acquires the Gray code from the Gray code area GC1 (S207). Then, the operation ends.

As described above, in the magnetic disk device 1a having the servo-read-during-write function, the Gray code area GC3 is included in addition to the Gray code area GC1 in the normal servo sector NSV. As a result, the amount of information of the Gray code obtained from the normal servo sector NSV in the seek operation and the read operation is increased.

For example, in a case where the Gray code is written in the Gray code areas GC1 and GC3 by the method illustrated in FIG. 18, when the magnetic head 22 passes through a specific servo sector SV, it is possible to acquire the full cylinder address only by the magnetic head 22 passing through the specific servo sector SV. Therefore, it is possible to improve the read performance or to reduce the frequency of occurrence of a seek error. That is, the performance is improved.

Note that the type of servo information whose amount of information is increased may be any of the preambles, the servo mark, or the Gray code as in the first embodiment. Alternatively, an area in which desirable information different from any of the preambles, the servo mark, and the Gray code is written may be added to the front area FA, and the length of the unwritable area UA may be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
 a magnetic disk comprising, a plurality of first servo sectors arranged in a circumferential direction at intervals, the plurality of first servo sectors each comprising, a first area in which first information including a preamble, a servo mark, and a Gray code is written, and a second area in which second information including a burst pattern is written, the second area disposed after the first area in a write and read direction along the circumferential direction, and a plurality of data areas each disposed between two first servo sectors adjacent to each other in the circumferential direction, wherein the plurality of first servo sectors comprises a plurality of second servo sectors and a plurality of third servo sectors, one or more of the plurality of third servo sectors are arranged between two adjacent second servo sectors of the plurality of second servo sectors, and a length of the first area comprised in each of the plurality of third servo sectors in the circumferential direction is longer than a length of the first area comprised in each of the plurality of second servo sectors in the circumferential direction;
 a magnetic head; and
 a controller that, in a write operation of writing data in one or more of the plurality of data areas using the magnetic head, demodulates the first information and the second information when the magnetic head passes through one of the plurality of second servo sectors and demodulates the second information without demodulating the first information when the magnetic head passes through one of the plurality of third servo sectors and, in a read operation of reading data from one or more of the plurality of data areas using the magnetic head, demodulates the first information and the second information when the magnetic head passes through one of the plurality of second servo sectors and demodulates the first information and the second information when the magnetic head passes through one of the plurality of third servo sectors.

2. The magnetic disk device according to claim 1, wherein the controller demodulates the first information and the second information when the magnetic head passes through one of the plurality of second servo sectors and demodulates the first information and the second information when the magnetic head passes through one of the plurality of third servo sectors in a seek operation of moving the magnetic head in a radial direction of the magnetic disk.

3. The magnetic disk device according to claim 2, wherein an amount of information of the Gray code written in the first area comprised in each of the plurality of third servo sectors is larger than an amount of information of the Gray code written in the first area comprised in each of the plurality of second servo sectors.

4. The magnetic disk device according to claim 2, wherein the magnetic head comprises a read head and a write head,
the write head relatively moves in the circumferential direction with respect to the magnetic disk with a delay of a first gap from the read head, and
the circumferential length of the first area comprised in each of the plurality of third servo sectors is set on a basis of the first gap.

5. The magnetic disk device according to claim 2, wherein the magnetic head comprises a read head and a write head,
the write head relatively moves in the circumferential direction with respect to the magnetic disk with a delay of a first gap from the read head,
the first gap varies depending on a radial position of the magnetic disk, and
the circumferential length of the first area comprised in each of the plurality of third servo sectors is set on a basis of a minimum value of the first gap.

6. The magnetic disk device according to claim 2, wherein the Gray code written in the first area comprised in each of the plurality of third servo sectors includes a full cylinder address, and
the Gray code written in the first area comprised in each of the plurality of second servo sectors includes a part of the cylinder address.

7. The magnetic disk device according to claim 1, wherein an amount of information of the Gray code written in the first area comprised in each of the plurality of third servo sectors is larger than an amount of information of the Gray code written in the first area comprised in each of the plurality of second servo sectors.

8. The magnetic disk device according to claim 1, wherein the magnetic head comprises a read head and a write head,
the write head relatively moves in the circumferential direction with respect to the magnetic disk with a delay of a first gap from the read head, and
the circumferential length of the first area comprised in each of the plurality of third servo sectors is set on a basis of the first gap.

9. The magnetic disk device according to claim 1, wherein the magnetic head comprises a read head and a write head,
the write head relatively moves in the circumferential direction with respect to the magnetic disk with a delay of a first gap from the read head,
the first gap varies depending on a radial position of the magnetic disk, and
the circumferential length of the first area comprised in each of the plurality of third servo sectors is set on a basis of a minimum value of the first gap.

10. The magnetic disk device according to claim 1, wherein the Gray code written in the first area comprised in each of the plurality of third servo sectors includes a full cylinder address, and
the Gray code written in the first area comprised in each of the plurality of second servo sectors includes a part of the cylinder address.

11. A method for controlling a magnetic disk device comprising a magnetic disk and a magnetic head,
the magnetic disk comprising:
a plurality of first servo sectors arranged in a circumferential direction at intervals, the plurality of first servo sectors each comprising: a first area in which first information including a preamble, a servo mark, and a Gray code is written; and a second area in which second information including a burst pattern is written, the second area disposed after the first area in a write and read direction along the circumferential direction; and
a plurality of data areas each disposed between two first servo sectors adjacent to each other in the circumferential direction,
wherein the plurality of first servo sectors comprises a plurality of second servo sectors and a plurality of third servo sectors,
one or more of the plurality of third servo sectors are arranged between two adjacent second servo sectors of the plurality of second servo sectors, and
a length of the first area comprised in each of the plurality of third servo sectors in the circumferential direction is longer than a length of the first area comprised in each of the plurality of second servo sectors in the circumferential direction,
the method comprising:
in a write operation of writing data in one or more of the plurality of data areas using the magnetic head, demodulating the first information and the second information when the magnetic head passes through one of the plurality of second servo sectors and demodulating the second information without demodulating the first information when the magnetic head passes through one of the plurality of third servo sectors; and
in a read operation of reading data from one or more of the plurality of data areas using the magnetic head, demodulating the first information and the second information when the magnetic head passes through one of the plurality of second servo sectors and demodulating the first information and the second information when the magnetic head passes through one of the plurality of third servo sectors.

12. The method according to claim 11, further comprising:
demodulating the first information and the second information when the magnetic head passes through one of the plurality of second servo sectors and demodulating the first information and the second information when the magnetic head passes through one of the plurality of third servo sectors in a seek operation of moving the magnetic head in a radial direction of the magnetic disk.

13. The method according to claim 12, wherein an amount of information of the Gray code written in the first area comprised in each of the plurality of third servo sectors is larger than an amount of information of the Gray code written in the first area comprised in each of the plurality of second servo sectors.

14. The method according to claim 12,
wherein the magnetic head comprises a read head and a write head,
the write head relatively moves in the circumferential direction with respect to the magnetic disk with a delay of a first gap from the read head, and
the circumferential length of the first area comprised in each of the plurality of third servo sectors is set on a basis of the first gap.

15. The method according to claim 12,
wherein the magnetic head comprises a read head and a write head,
the write head relatively moves in the circumferential direction with respect to the magnetic disk with a delay of a first gap from the read head,
the first gap varies depending on a radial position of the magnetic disk, and
the circumferential length of the first area comprised in each of the plurality of third servo sectors is set on a basis of a minimum value of the first gap.

16. The method according to claim 12,
wherein the Gray code written in the first area comprised in each of the plurality of third servo sectors includes a full cylinder address, and
the Gray code written in the first area comprised in each of the plurality of second servo sectors includes a part of the cylinder address.

17. The method according to claim 11,
wherein an amount of information of the Gray code written in the first area comprised in each of the plurality of third servo sectors is larger than an amount of information of the Gray code written in the first area comprised in each of the plurality of second servo sectors.

18. The method according to claim 11,
wherein the magnetic head comprises a read head and a write head,
the write head relatively moves in the circumferential direction with respect to the magnetic disk with a delay of a first gap from the read head, and
the circumferential length of the first area comprised in each of the plurality of third servo sectors is set on a basis of the first gap.

19. The method according to claim 11,
wherein the magnetic head comprises a read head and a write head,
the write head relatively moves in the circumferential direction with respect to the magnetic disk with a delay of a first gap from the read head,
the first gap varies depending on a radial position of the magnetic disk, and
the circumferential length of the first area comprised in each of the plurality of third servo sectors is set on a basis of a minimum value of the first gap.

20. The method according to claim 11,
wherein the Gray code written in the first area comprised in each of the plurality of third servo sectors includes a full cylinder address, and
the Gray code written in the first area comprised in each of the plurality of second servo sectors includes a part of the cylinder address.

* * * * *